United States Patent
Ben-Harosh et al.

(10) Patent No.: US 9,549,316 B2
(45) Date of Patent: Jan. 17, 2017

(54) HOST DEVICE COUPLED TO A MOBILE PHONE AND METHOD OF OPERATING THE SAME

(71) Applicant: MCE-SYS LTD., Tel Aviv (IL)

(72) Inventors: Almog Ben-Harosh, Pardes Hanna (IL); Erez Manor, Herzlia (IL)

(73) Assignee: MCE-SYS Ltd., Tel Aviv (IL)

( * ) Notice: Subject to any disclaimer, the term of this patent is extended or adjusted under 35 U.S.C. 154(b) by 0 days.

(21) Appl. No.: 14/774,136

(22) PCT Filed: Mar. 14, 2014

(86) PCT No.: PCT/IB2014/059809
§ 371 (c)(1),
(2) Date: Sep. 10, 2015

(87) PCT Pub. No.: WO2014/141180
PCT Pub. Date: Sep. 18, 2014

(65) Prior Publication Data
US 2016/0044498 A1    Feb. 11, 2016

Related U.S. Application Data

(60) Provisional application No. 61/786,053, filed on Mar. 14, 2013.

(51) Int. Cl.
*H04W 24/00*    (2009.01)
*H04W 8/22*    (2009.01)
(Continued)

(52) U.S. Cl.
CPC ............ *H04W 8/22* (2013.01); *H04L 63/0428* (2013.01); *H04W 88/06* (2013.01)

(58) Field of Classification Search
CPC ...... H04W 8/245; H04W 24/00; H04W 24/02; H04W 24/06; H04W 24/08; H04W 88/02; H04W 16/18
(Continued)

(56) References Cited

U.S. PATENT DOCUMENTS 8,396,465 B2    3/2013    Danford et al.
2006/0223486 A1*    10/2006    Ruff .................. H04M 1/24
                                                            455/343.1
(Continued)

FOREIGN PATENT DOCUMENTS

WO    WO2012073126 A1    6/2012

*Primary Examiner* — Temica M Beamer
(74) *Attorney, Agent, or Firm* — Marc Van Dyke; Fourth Dimension IP

(57) ABSTRACT

Some embodiments relate to a host-side surrogate tool configured to service mobile phones from a host device that is coupled to one or more peripheral cell phones. The presently-disclosed host-side surrogate tool executes on the host device concurrently with one or more software components of a vendor-compliant phone maintenance tool. In some embodiments, the concurrently-executing host-side surrogate tool may cause the vendor-compliant phone maintenance tool to provide functionality for which it was not intended. In some embodiments, it may be said that the host-side surrogate tool provides a 'semi-virtual' environment under which host-side vendor-compliant phone maintenance tool operates. Related methods, devices and systems are disclosed herein.

6 Claims, 14 Drawing Sheets

(51) Int. Cl.
*H04L 29/06* (2006.01)
*H04W 88/06* (2009.01)

(58) Field of Classification Search
USPC .......................................... 455/418, 423, 425
See application file for complete search history.

(56) References Cited

U.S. PATENT DOCUMENTS

| | | |
|---|---|---|
| 2007/0285227 A1* | 12/2007 | Timothy ............... G06F 1/1626 340/539.13 |
| 2009/0228868 A1 | 9/2009 | Drukman et al. |
| 2010/0299376 A1 | 11/2010 | Batchu et al. |
| 2012/0072902 A1 | 3/2012 | Guo et al. |
| 2013/0107720 A1* | 5/2013 | Huang .................... H04L 43/50 370/241 |

\* cited by examiner

Executing S391 on a host device coupled to a plurality of peripheral phones by providing a semi-virtual host-side software environment to multiple instances of the singleton-limited host-side phone maintenance SW tool to route communication Between each phone maintenance SW tool instance and its matching coupled peripheral phone, wherein: i. the communication routing includes, when a given SW tool instance attempts to send phone commands to a non-matching peripheral phone, intercepting the phone commands and forwarding them to a matching peripheral phone instead; and
ii. the semi-virtual host-side software environment hides the existence of non-matching peripheral phones from each instance of the singleton-limited host-side phone maintenance software tool.

FIG. 9

HOST DEVICE COUPLED TO A MOBILE PHONE AND METHOD OF OPERATING THE SAME

BACKGROUND

Vendor Compliant Phone Maintenance Tools

By way of introduction, and referring to FIG. 1, it is common for mobile-phone vendors to provide vendor-compliant phone maintenance tool 180 for communicating with a mobile phone (e.g. cell-phone) 200 coupled to a host computer 100 via respective device ports 110, 210 (e.g. device port 110 may be a USB socket and port 210 may be a USB plug). Typically, these phone maintenance tools run under a so-called 'plug-and-play' operating system such as Mac OS® or Windows® XP or Windows Vista® or Windows 7® or Windows 8®.

When the peripheral phone device 200 is coupled to the host 100 as a peripheral 'slave' device, it is possible access the peripheral phone from the host device (e.g. via a keyboard or other user control) using. from the phone to the host 100. the vendor-compliant phone maintenance tools 180. Operations that are handled by vendor-compliant phone maintenance tools include but are not limited to re-flashing, managing the file system of the phone (e.g. expunging personal data so that phone can be resold), configuring, firmware upgrade/downgrade, downloading data from the phone to the host, performing diagnostics, and installation of phone applications.

As described in detail in (WO2012073126) HOST DEVICE COUPLED TO A USB PERIPHERAL AND METHOD OF OPERATING THE SAME of one of the present inventors, and incorporated by reference herein in its entirety, commercially-available mobile phones are typically associated with their own phone-specific (or vendor-specific or phone-family-specific) command and protocol 'language.' Therefore, in order to communicate with a particular phone model, mobile phone vendors customize the host-side phone tool (i.e. software executing on host-device 100) to communicate with the particula phone model in a 'compliant; manner—i.e. according to the particular command and protocol language of the phone. customized host-side tool is thus referred to as a "vendor-compliant phone maintenance tool 180."

As illustrated in FIG. 1, a host computer 100 includes one or microprocessor(s) 130 and a memory 120—e.g. including any combination of volatile and/or non-volatile memory. The phone maintenance tool 180 resides within memory 120 on the host side and is executed by microprocessor(s) 130. Phone maintenance tool control logic, interacts with peripheral phone 200 via host-side vendor drivers 240.

In the example of FIG. 1, phone maintenance tool 180 receives user input data 410 (e.g. from host-side device such as a mouse or touchscreen or keyboard) and outputs display data 420—this 'display data may be either logical (e.g. a flag indicated that a user has checked a check-box or left a check-box unchecked) or visual (i.e. pixel data—for example, including a screen image of the checked check-box).

SUMMARY OF EMBODIMENTS

Some embodiments relate to a host-side surrogate tool configured to service mobile phones from a host device that is coupled to one or more peripheral cell phones. The presently-disclosed host-side surrogate tool executes on the host device concurrently with one or more software components of a vendor-compliant phone maintenance tool.

In some embodiments, the concurrently-executing host-side surrogate tool may cause the vendor-compliant phone maintenance tool to provide functionality for which it was not intended. In some embodiments, it may be said that the host-side surrogate tool provides a 'semi-virtual' environment under which host-side vendor-compliant phone maintenance tool operates. Three examples of providing the semi-virtual environment for the host-side vendor-compatible tool are now presented.

A first example of providing the semi-virtual environment (see FIGS. 4 and 6) relates to enabling execution, by the peripheral phone, of tool-phone-state-incompatible commands According to this 'example, the host-side surrogate tool extends the functionality of the host-side vendor-compliant phone maintenance tool to enable execution, by the host-side vendor-compliant phone maintenance tool, of tool-phone-state-incompatible commands. Towards this end, the host-side surrogate tool may '(i) spoof'/send inaccurate information (i.e. about a current state of the peripheral phone) to the vendor-compliant phone maintenance tool and/or (ii) communicate (e.g. directly communicate without use of the vendor-compliant tool) with the peripheral phone to modify a state thereof.

Tool-phone-state-incompatible commands relate to the host-side vendor-compliant phone maintenance tool and are discussed below. Briefly, tool-phone-state-incompatible commands relate to situation where (i) peripheral phone has multiple operating modes including first and second mode and (ii) the host-side vendor-compliant phone maintenance tool is configured to execute a host-side tool command only when the peripheral phone is in a specific mode. One non-limiting scenario related to 'tool-phone-state-incompatible' commands is as follows: (i) the host-side vendor-compliant phone maintenance tool is "hardcoded" to only execute a certain host-side command if the peripheral phone is in normal mode (i.e. as opposed to emergency mode); (ii) however, if the peripheral phone is in emergency mode, then the 'certain command' is said to be tool-phone-state-incompatible and (iii) if the peripheral phone is in normal mode, then the 'certain command' is said to be tool-phone-state-compatible, A second example of providing the semi-virtual environment (see FIGS. 8A-8B) relates to a situation where multiple peripheral phones are simultaneously coupled to, and in communication with, the host device. More specifically, the second example relates to vendor-compliant phone maintenance tools that, during normal operation thereof, are hard-coded to operate only with at most N coupled peripheral phone devices (N is a positive integer—e.g. one, two or any integer). In the second example, the surrogate tool may extend the functionality of the vendor-compliant phone maintenance tool to operate with M coupled peripheral device wherein M is a positive integer exceeding N. Towards this end, once again false information is supplied, by the host-side surrogate tool, to the host-side vendor-compliant phone maintenance tool. In particular, it is possible to provide false information about the number of peripheral phones coupled to the host device. To avoid conflicts, the host-side surrogate tool may emulate a device connectivity environment, and map instances of the vendor-compliant phone maintenance tools to matching peripheral phones.

A third example (see FIG. 5) of providing the semi-virtual environment relates to security policies. In particular, according to the third example, a host-side vendor-compliant phone maintenance tool may be hard-coded to enforce a security policy so as to only perform some sort of functionality (e.g. access a phone ROM) when the host device is logged in under a privileged account of the host-side operating system (OS). In this third example, the surrogate tool overrides this functionality. For example, to circumvent this limitation, the co-executing host-side surrogate tool may (i) intercept attempts by the host-side vendor-compliant tool to access the host-side resource and (ii) instead, to re-direct the access attempt that the vendor-compatible phone maintenance tool receives a pre-cached ROM object.

There are a number of technical scenarios where the presently host-side surrogate tools, and where the presently-disclosed techniques are particularly useful. For example, it may be desired to operate a cell phone service center where it is required to service phones from a large variety of models or vendors from a single host PC device in a manner that is fast and efficient. For reasons of product liability reasons or for any other reason, it may be required to communicate with the peripheral phone from the host device primarily via the vendor-compliant phone maintenance tool, rather than circumventing the vendor-compliant phone maintenance tool altogether.

Embodiments of the present invention relate to apparatus and methods for overcoming various constraints imposed by the host-side vendor-compliant phone maintenance tool.

It is now disclosed method "A" of operating a host device coupled to a multi-mode peripheral phone where a vendor-compliant phone maintenance tool thereof specific to the coupled phone executes on the host device, the multi-mode phone having first and second operating modes, the method comprising: a. at a time when the multi-mode peripheral mode is in a first of the operating modes, receiving a tool-phone-state-incompatible user tool command at the host device to modify the peripheral phone, the tool-phone-state-incompatible tool command being incompatible with the combination of the coupled phone in the first operating mode and the vendor-compliant phone maintenance tool executing on the host device; b. in response to the receiving of the user command at the host device: i. classifying the received user command to determine if the phone is required to be in the first operating mode in order to execute the user command; and ii. contingent upon a positive classifying, blocking receipt or execution of the command by the vendor-compliant phone maintenance tool and sending the peripheral phone a mode-transition command not via the vendor-compliant phone maintenance tool to effect a mode transition from the first to the second operating mode so as to render the user command tool-phone-state-compatible; and iii. after the sending of the mode-transition command, forwarding the user command to the vendor-compliant phone maintenance tool or unblocking execution of the user command by the vendor-compliant phone maintenance tool.

In some embodiments (i.e. related to the method, device or system) the first operating mode is an emergency operating mode and the second operating mode is a normal operating mode.

It is now disclosed a host device comprising: a. a host-peripheral interface (e.g. a USB interface) for inter-device coupling between the host device and a multi-mode peripheral phone where a vendor-compliant phone maintenance tool thereof specific to the coupled phone executes on the host device, the multi-mode phone having first and second operating mode; and b. electronic circuitry configured to: i. at a time when the multi-mode peripheral mode is in a first of the operating modes, receiving a tool-phone-state-incompatible user tool command at the host device to modify the peripheral phone, the tool-phone-state-incompatible tool command being incompatible with the combination of the coupled phone in the first operating mode and the vendor-compliant phone maintenance tool executing on the host device; ii. in response to the receiving of the user command at the host device: i. classifying the received user command to determine if the phone is required to be in the first operating mode in order to execute the user command; and ii. contingent upon a positive classifying, blocking receipt or execution of the command by the vendor-compliant phone maintenance tool and sending the peripheral phone a mode-transition command not via the vendor-compliant phone maintenance tool to effect a mode transition from the first to the second operating mode so as to render the user command tool-phone-state-compatible; and iii. after the sending of the mode-transition command, forwarding the user command to the vendor-compliant phone maintenance tool or unblocking execution of the user command by the vendor-compliant phone maintenance tool It is now disclosed a host device comprising: a. a host-peripheral interface (e.g. a USB interface) for inter-device coupling between the host device and a peripheral phone where a vendor-compliant phone maintenance tool specific to the coupled phone executes on the host device; and b. electronic circuitry configured to: i. locally maintaining a cache of mobile phone ROM files that is accessible when the host device operates under a first user account; ii. when the host device operates under the first user account, executing code of the vendor-compliant phone maintenance tool so the tool generates a request to fetch a mobile phone ROM file from a local repository in a privileged location that is only accessible when the host device operates under a second user account having additional privileges not available when under the first user account; iii. responding to the request generated by the phone maintenance tool by: A. fetching the requested mobile phone ROM file from the first-user-account-accessible local cache; and B. providing, to the vendor-compliant phone maintenance tool, a handle to the fetched requested mobile phone ROM file.

It is now disclosed a host device comprising: a. a host-peripheral interface (e.g. a USB interface) for inter-device coupling between the host device and a peripheral phone where a vendor-compliant phone maintenance tool specific to the coupled phone executes on the host device; b. electronic circuitry configured to: i. when the host device operates under a first user account, the vendor-compliant tool, executing on the host device operating under the first user account so as to generate a request to access mobile phone ROM file(s) from a first local cache, responding to the request of step (a) by: A. blocking the request of step (i) so that the vendor-compliant maintenance tool does not access the first local cache; B. fetching the mobile phone ROM file(s) requested by the maintenance tool in step (i) from a user-account-independent local cache; C. providing, to the maintenance tool, a handle to the mobile phone ROM file fetched in response to the request of step (i) from the user-account-independent local cache; and ii. when the host device operates under second user account and the vendor-compliant tool, executing on the host device operating under the second user account so as to generate a request to access mobile phone ROM file(s) from a second local cache, responding to the request of step (b) by: A. blocking the request of step (ii) so that the vendor-compliant maintenance tool does not access the second local cache; B. fetching the mobile phone ROM file(s) requested by the maintenance tool in step (ii) from the user-account-independent local cache; C. providing, to the maintenance tool, a handle to the mobile phone ROM file fetched in response to the request of step (ii) from the user-account-independent local cache.

It is now disclosed a host device comprising: a. a host-peripheral interface (e.g. a USB interface) for inter-device coupling between the host device and a peripheral phone where a vendor-compliant phone maintenance tool specific to the coupled phone executes on the host device; and b. electronic circuitry configured to: i. receiving a tool-phone-state-incompatible user tool-command at the host device to modify the peripheral phone, the tool-phone-state-incompatible tool command being incompatible with the combination of the coupled phone in its current state and the vendor-compliant phone maintenance tool executing on the host device; ii. in response to an attempted mode interrogation by the vendor-compliant phone maintenance tool executing on the host device of the peripheral phone, sending a falsified description of the peripheral phone state (e.g. indicating that the phone is in normal mode when, in fact, it is in emergency mode) to the executing vendor-compliant phone maintenance tool so that the user command is tool-phone-state compatible relative to the falsified description.

It is now disclosed a host device comprising: a. a host-peripheral interface (e.g. a USB interface) for inter-device coupling between the host device and a peripheral phone where a vendor-compliant phone maintenance tool specific to the coupled phone executes on the host device, b. electronic circuitry configured to: i. executing code of the vendor-compliant phone maintenance tool so that the tool respectively generates, for each of first and second privilege-limited user accounts, first and second host-local ROM repositories, each host-local ROM repository being only accessible when the host device operates under its corresponding user account; ii. maintaining on or local to the host device, an additional ROM repository that is host user-account independent; iii. when the host device is operating under the first privilege-limited user account, intercepting, on the host, an attempted access operation, by the vendor-compliant phone maintenance tool, of a requested phone firmware object from a host-local ROM repository specific to the first user account; iv. in response to the intercepting, fetching the phone firmware object requested by the vendor-compliant phone maintenance tool from the user-account-independent additional ROM repository; and v. forwarding, to the vendor-compliant phone maintenance tool, a handle to the fetched phone firmware object.

It is now disclosed a host device comprising: a. a host-peripheral interface(s) (e.g. a USB interface) for inter-device coupling between the host device and a plurality of peripheral phones and where the host device simultaneously executes multiple phone maintenance tool instances such that each tool instance is compatible with all of the peripheral phones of the plurality; and b. electronic circuitry configured to: a. maintaining in host device memory, a tool instance-phone instance map between each phone maintenance tool instance and its matching peripheral phone; and b. whenever a given one of the phone maintenance tool instances attempts to access a candidate peripheral phone that is tool-compatible and map-incompatible, blocking the attempted access and providing a handle to a different peripheral phone other than the candidate phone that is selected from the plurality of coupled peripheral phones to match the given phone maintenance tool instance according to the tool instance-phone instance map.

It is now disclosed a host device configured to extend capabilities of a singleton-limited host-side phone maintenance software (SW) tool executing on a host device coupled to a plurality of peripheral phones by providing a semi-virtual host-side software environment to multiple instances of the singleton-limited host-side phone maintenance SW tool to route communication between each phone maintenance SW tool instance and its matching coupled peripheral phone, wherein: i. the communication routing includes, when a given SW tool instance attempts to send phone commands to a non-matching peripheral phone, intercepting the phone commands and forwarding them to a matching peripheral phone instead; and ii. the semi-virtual host-side software environment hides the existence of non-matching peripheral phones from each instance of the singleton-limited host-side phone maintenance software tool.

It is now disclosed a method of operating a multi-account host device coupled to a peripheral phone where a vendor-compliant phone maintenance tool specific to the coupled phone executes on the host device, each account being associated with a different respective privilege level and electronic circuitry configured to: when the user is logged in under an account lacking administrator privileges so that the host device is operating under a privilege-limited user account: a. executing, in the background, a surrogate process having administrator privileges; b. intercepting, from the vendor-compliant phone maintenance tool specific, a privilege-incompatible host-device OS request to modify the phone; and c. routing at least a portion of the vendor-compliant phone maintenance tool generated request to modify the phone via the surrogate process so that host-side restricted resources required to complete the phone-modification request are provided by the surrogate process.

It is now disclosed a host device comprising: a. a host-peripheral interface (e.g. a USB interface) for inter-device coupling between the host device and a a peripheral phone where a phone maintenance tool executes on the host device, device comprising electronic circuitry comprising: a. detecting and blocking a request by the host-executing phone maintenance tool to locally backup user data from the phone onto the host device in an unencrypted form; b. retrieving the user data from the phone, encrypting the user data on the host device, and storing the user data on the host device or remotely away from the host device; c. sending a message to the host-executing phone maintenance tool that the user data has been backed up on the host device in an unencrypted form; and d. at a later time, responding to a request, issued by the host-executing phone maintenance tool, to read the user data locally and in an unencrypted form by: i. retrieving and decrypting the remotely stored encrypted user data, and ii. providing the decrypted user data to the host-executing phone maintenance tool, wherein the method is carried out so that the user data is never backed up, in an unencrypted form, on the host device.

In some embodiments (i.e. related to the method, device or system) the user tool command is selected from the group consisting of: (I) a command for a host-side phone maintenance tool to flash the peripheral phone; (II) a command for a host-side phone maintenance tool to reset the peripheral phone.

It is now disclosed method "B" of operating a multi-user-account host device coupled to a peripheral phone where a vendor-compliant phone maintenance tool specific to the coupled phone executes on the host device, the method comprising: a. locally maintaining a cache of mobile phone ROM files that is accessible when the host device operates under a first user account; b. when the host device operates under the first user account, executing code of the vendor-compliant phone maintenance tool so the tool generates a request to fetch a mobile phone ROM file from a local repository in a privileged location that is only accessible when the host device operates under a second user account having additional privileges not available when under the first user account; c. responding to the request generated by the phone maintenance tool by: i. fetching the requested mobile phone ROM file from the first-user-account-accessible local cache; and ii. providing, to the vendor-compliant phone maintenance tool, a handle to the fetched requested mobile phone ROM file.

It is now disclosed method "C" of operating a multi-user-account host device coupled to a peripheral phone where a vendor-compliant phone maintenance tool specific to the coupled phone executes on the host device, the method comprising: a. when the host device operates under a first user account, the vendor-compliant tool, executing on the host device operating under the first user account so as to generate a request to access mobile phone ROM file(s) from a first local cache, responding to the request of step (a) by: i. blocking the request of step (a) so that the vendor-compliant maintenance tool does not access the first local cache; ii. fetching the mobile phone ROM file(s) requested by the maintenance tool in step (a) from a user-account-independent local cache; iii. providing, to the maintenance tool, a handle to the mobile phone ROM file fetched in response to the request of step (a) from the user-account-independent local cache; and b. when the host device operates under second user account and the vendor-compliant tool, executing on the host device operating under the second user account so as to generate a request to access mobile phone ROM file(s) from a second local cache, responding to the request of step (b) by: i. blocking the request of step (b) so that the vendor-compliant maintenance tool does not access the second local cache; ii. fetching the mobile phone ROM file(s) requested by the maintenance tool in step (b) from the user-account-independent local cache; iii. providing, to the maintenance tool, a handle to the mobile phone ROM file fetched in response to the request of step (b) from the user-account-independent local cache.

It is now disclosed method "D" of operating a host device coupled to a peripheral phone where a vendor-compliant phone maintenance tool specific to the coupled phone executes on the host device, the method comprising: a. receiving a tool-phone-state-incompatible user tool-command at the host device to modify the peripheral phone, the tool-phone-state-incompatible tool command being incompatible with the combination of the coupled phone in its current state and the vendor-compliant phone maintenance tool executing on the host device; b. in response to an attempted mode interrogation by the vendor-compliant phone maintenance tool executing on the host device of the peripheral phone, sending a falsified description of the peripheral phone state (e.g. indicating that the phone is in normal mode when, in fact, it is in emergency mode) to the executing vendor-compliant phone maintenance tool so that the user command is tool-phone-state compatible relative to the falsified description.

In some embodiments (i.e. related to the method, device or system) the falsified description includes a falsified description of a normal mode/emergency mode state.

In some embodiments (i.e. related to the method, device or system) the falsified description includes a falsified description of the phone OS version.

It is now disclosed method "D" of operating a multi-user-account host device coupled to a peripheral phone where a vendor-compliant phone maintenance tool specific to the coupled phone executes on the host device, the method comprising: a. executing code of the vendor-compliant phone maintenance tool so that the tool respectively generates, for each of first and second privilege-limited user accounts, first and second host-local ROM repositories, each host-local ROM repository being only accessible when the host device operates under its corresponding user account; b. maintaining on or local to the host device, an additional ROM repository that is host user-account independent; c. when the host device is operating under the first privilege-limited user account, intercepting, on the host, an attempted access operation, by the vendor-compliant phone maintenance tool, of a requested phone firmware object from a host-local ROM repository specific to the first user account; d. in response to the intercepting, fetching the phone firmware object requested by the vendor-compliant phone maintenance tool from the user-account-independent additional ROM repository; and e. forwarding, to the vendor-compliant phone maintenance tool, a handle to the fetched phone firmware object.

It is now disclosed method "E" of operating a host device coupled to a plurality of peripheral phones and where the host device simultaneously executes multiple phone maintenance tool instances such that each tool instance is compatible with all of the peripheral phones of the plurality the method comprising a. maintaining in host device memory, a tool instance-phone instance map between each phone maintenance tool instance and its matching peripheral phone; and b. whenever a given one of the phone maintenance tool instances attempts to access a candidate peripheral phone that is tool-compatible and map-incompatible, blocking the attempted access and providing a handle to a different peripheral phone other than the candidate phone that is selected from the plurality of coupled peripheral phones to match the given phone maintenance tool instance according to the tool instance-phone instance map.

It is now disclosed method "F" of extending capabilities of a singleton-limited host-side phone maintenance software (SW) tool executing on a host device coupled to a plurality of peripheral phones by providing a semi-virtual host-side software environment to multiple instances of the singleton-limited host-side phone maintenance SW tool to route communication between each phone maintenance SW tool instance and its matching coupled peripheral phone, wherein: i. the communication routing includes, when a given SW tool instance attempts to send phone commands to a non-matching peripheral phone, intercepting the phone commands and forwarding them to a matching peripheral phone instead; and ii. the semi-virtual host-side software environment hides the existence of non-matching peripheral phones from each instance of the singleton-limited host-side phone maintenance software tool.

It is now disclosed method "G" of operating a multi-account host device coupled to a peripheral phone where a vendor-compliant phone maintenance tool specific to the coupled phone executes on the host device, each account being associated with a different respective privilege level the method comprising:

when the user is logged in under an account lacking administrator privileges so that the host device is operating under a privilege-limited user account:
  a. executing, in the background, a surrogate process having administrator privileges;
  b. intercepting, from the vendor-compliant phone maintenance tool specific, a privilege-incompatible host-device OS request to modify the phone; and
  c. routing at least a portion of the vendor-compliant phone maintenance tool generated request to modify the phone via the surrogate process so that host-side restricted resources required to complete the phone-modification request are provided by the surrogate process.

It is now disclosed method "H" of operating a host device coupled to a peripheral phone where a phone maintenance tool executes on the host device, the method comprising: a. detecting and blocking a request by the host-executing phone maintenance tool to locally backup user data from the phone onto the host device in an unencrypted form; b. retrieving the user data from the phone, encrypting the user data on the host device, and storing the user data on the host device or remotely away from the host device; c. sending a message to the host-executing phone maintenance tool that the user data has been backed up on the host device in an unencrypted form; and d. at a later time, responding to a request, issued by the host-executing phone maintenance tool, to read the user data locally and in an unencrypted form by: i. retrieving and decrypting the remotely stored encrypted user data, and ii. providing the decrypted user data to the host-executing phone maintenance tool, wherein the method is carried out so that the user data is never backed up, in an unencrypted form, on the host device.

In some embodiments (i.e. related to the method, device or system) user data is only stored remotely away from the host device and no encrypted or unencrypted user data is stored on the host device.

Method I: Preventing a Vendor Tool 180 from Upgrading Itself or from Upgrading the Phone (Method I)

In some embodiments, vendor tool may attempt to upgrade itself or the phone or upgrading a host-side local ROM repository by downloading (and storing on the host-side) newer ROM files for phone 200—e.g. to download a new version thereof from the server. It is possible for surrogate tool 170 to prevent this from happening in any one or more of a number of ways.

Block the Call (e.g. by Surrogate Tool 170):

For example, it may be possible to block remote access of data from vendor tool. Some tools (e.g. WebSL) check first online, then locally—blocking the Online will cause them to work only with the local repository.

Modify/Falsify Request (e.g. by Surrogate Tool 170) from Vendor Tool 180 after it is Generated When we cannot block the call for some reason. Could prevent auto-update, especially if request includes current version. In cases when we depend on the server's logic: request includes details such as device model, current version, tool identity. We modify the parameters, for example the version to an older than actual. Thus we allow re-flashing or downgrading or re-branding when no such original support is available.

Modify/Falsify Response Received (e.g. by Surrogate Tool 170) from the Server Before it is Received by Vendor Tool 180— could prevent update, if we modify the "update available" (to "no"), "most current version" (to same as current), or sabotage/modify the download link (to a non-existing) sent back from the remote server.

Could prevent ROM retrieval if modify the version or sabotage the location.

Could direct to local location or another version (for downgrade/reflash/different operator's ROM) if modify the URI.

Could direct to local repository even if tool originally does not support it (e.g. Samsung KIES & Sony USP)

In some embodiments, a system comprises any disclosed host device and any of the coupled phone(s).

The skilled artisan will appreciate that any combination of method, device, and system features may be combined in any combination, including but not limited to the following combinations: Methods A and B; Methods A and C; Methods A and D; Methods A and E; Methods A and F; Methods A and G; Methods A and H; Methods A and I; Methods B and C; Methods B and D; Methods B and E; Methods B and F; Methods B and G; Methods B and H; Methods B and I; Methods C and D; Methods C and E; Methods C and F; Methods C and G; Methods C and H; Methods C and I; Methods D and E; Methods D and F; Methods D and G; Methods D and H; Methods D and I; Methods E and F; Methods E and G; Methods E and H; Methods E and I; Methods F and G; Methods F and H; Methods F and I; Methods G and H; Methods G and I; Methods H and I; Methods A, B and C; Methods A, B and D; Methods A, B and E; Methods A, B and F; Methods A, B and G; Methods A, B and H; Methods A, B and I; Methods A, C and D; Methods A, C and E; Methods A, C and F; Methods A, C and G; Methods A, C and H; Methods A, C and I; Methods A, D and E; Methods A, D and F; Methods A, D and G; Methods A, D and H; Methods A, D and I; Methods A, E and F; Methods A, E and G; Methods A, E and H; Methods A, E and I; Methods A, F and G; Methods A, F and H; Methods A, F and I; Methods A, G and H; Methods A, G and I; Methods A, H and I; Methods B, C and D; Methods B, C and E; Methods B, C and F; Methods B, C and G; Methods B, C and H; Methods B, C and I; Methods B, D and E; Methods B, D and F; Methods B, D and G; Methods B, D and H; Methods B, D and I; Methods B, E and F; Methods B, E and G; Methods B, E and H; Methods B, E and I; Methods B, F and G; Methods B, F and H; Methods B, F and I; Methods B, G and H; Methods B, G and I; Methods B, H and I; Methods C, D and E; Methods C, D and F; Methods C, D and G; Methods C, D and H; Methods C, D and I; Methods C, E and F; Methods C, E and G; Methods C, E and H; Methods C, E and I; Methods C, F and G; Methods C, F and H; Methods C, F and I; Methods C, G and H; Methods C, G and I; Methods C, H and I; Methods D, E and F; Methods D, E and G; Methods D, E and H; Methods D, E and I; Methods D, F and G; Methods D, F and H; Methods D, F and I; Methods D, G and H; Methods D, G and I; Methods D, H and I; Methods E, F and G; Methods E, F and H; Methods E, F and I; Methods E, G and H; Methods E, G and I; Methods E, H and I; Methods F, G and H; Methods F, G and I; Methods F, H and I; Methods G, H and I; Methods A, B, C and D; Methods A, B, C and E; Methods A, B, C and F; Methods A, B, C and G; Methods A, B, C and H; Methods A, B, C and I; Methods A, B, D and E; Methods A, B, D and F; Methods A, B, D and G; Methods A, B, D and H; Methods A, B, D and I; Methods A, B, E and F; Methods A, B, E and G; Methods A, B, E and H; Methods A, B, E and I; Methods A, B, F and G; Methods A, B, F and H; Methods A, B, F and I; Methods A, B, G and H; Methods A, B, G and I; Methods A, B, H and I; Methods A, C, D and E; Methods A, C, D and F; Methods A, C, D and G; Methods A, C, D and H; Methods A, C, D and I; Methods A, C, E and F; Methods A, C, E and G; Methods A, C, E and H; Methods A, C, E and I; Methods A, C, F and G; Methods A, C, F and H; Methods A, C, F and I; Methods A, C, G and H; Methods A, C, G and I; Methods A, C, H and I; Methods A, D, E and F; Methods A, D, E and G; Methods A, D, E and H; Methods A, D, E and I; Methods A, D, F and G; Methods A, D, F and H; Methods A, D, F and I; Methods A, D, G and H; Methods A, D, G and I; Methods A, D, H and I; Methods A, E, F and G; Methods A, E, F and H; Methods A, E, F and I; Methods A, E, G and H; Methods A, E, G and I; Methods A, E, H and I; Methods A, F, G and H; Methods A, F, G and I; Methods A, F, H and I; Methods A, G, H and I; Methods B, C, D and E; Methods B, C, D and F; Methods B, C, D and G; Methods B, C, D and H; Methods B, C, D and I; Methods B, C, E and F; Methods B, C, E and G; Methods B, C, E and H; Methods B, C, E and I; Methods B, C, F and G; Methods B, C, F and H; Methods B, C, F and I; Methods B, C, G and H; Methods B, C, G and I; Methods B, C, H an d I; Methods B, D, E and F; Methods B, D, E and G; Methods B, D, E and H; Methods B, D, E and I; Methods B, D, F and G; Methods B, D, F and H; Methods B, D, F and I; Methods B, D, G and H; Methods B, D, G and I; Methods B, D, H and I; Methods B, E, F and G; Methods B, E, F and H; Methods B, E, F and I; Methods B, E, G and H; Methods B, E, G and I; Methods B, E, H and I; Methods B, F, G and H; Methods B, F, G and I; Methods B, F, H and I; Methods B, G, H and I; Methods C, D, E and F; Methods C, D, E and G; Methods C, D, E and H; Methods C, D, E and I; Methods C, D, F and G; Methods C, D, F and H; Methods C, D, F and I; Methods C, D, G and H; Methods C, D, G and I; Methods C, D, H and I; Methods C, E, F and G; Methods C, E, F and H; Methods C, E, F and I; Methods C, E, G and H; Methods C, E, G and I; Methods C, E, H and I; Methods C, F, G and H; Methods C, F, G and I; Methods C, F, H and I; Methods C, G, H and I; Methods D, E, F and G; Methods D, E, F and H; Methods D, E, F and I; Methods D, E, G and H; Methods D, E, G and I; Methods D, E, H and I; Methods D, F, G and H; Methods D, F, G and I; Methods D, F, H and I; Methods D, G, H and I; Methods E, F, G and H; Methods E, F, G and I; Methods E, F, H and I; Methods E, G, H and I; Methods F, G, H and I;

The skilled artisan will appreciate that every combination is intended, and only for brevity is only a subset of the possible combinations explicitly listed.

In some embodiments a method of operating a host device coupled to a multi-mode peripheral phone where a vendor-compliant phone maintenance tool thereof specific to the coupled phone executes on the host device, the multi-mode phone having first and second operating modes, the method comprising, at a time when the multi-mode peripheral mode is in a first of the operating modes, receiving a tool-phone-state-incompatible user tool command at the host device to modify the peripheral phone, the tool-phone-state-incompatible tool command being incompatible with the combination of the coupled phone in the first operating mode and the vendor-compliant phone maintenance tool executing on the host device; in response to the receiving of the user command at the host device classifying the received user command to determine if the phone is required to be in the first operating mode in order to execute the user command; and contingent upon a positive classifying, blocking receipt or execution of the command by the vendor-compliant phone maintenance tool and sending the peripheral phone a mode-transition command not via the vendor-compliant phone maintenance tool to effect a mode transition from the first to the second operating mode so as to render the user command tool-phone-state-compatible; after the sending of the mode-transition command, forwarding the user command to the vendor-compliant phone maintenance tool or unblocking execution of the user command by the vendor-compliant phone maintenance tool.

In some embodiments wherein the first operating mode is an emergency operating mode and the second operating mode is a normal operating mode.

In some embodiments wherein the user tool command selected from the group consisting of a command for a host-side phone maintenance tool to flash the peripheral phone a command for a host-side phone maintenance tool to reset the peripheral phone.

In some embodiments a method of operating a multi-user-account host device coupled to a peripheral phone where a vendor-compliant phone maintenance tool specific to the coupled phone executes on the host device, the method comprising locally maintaining a cache of mobile phone ROM files that is accessible when
the host device operates under a first user account when the host device operates under the first user account, executing code of the vendor-compliant phone maintenance tool so the tool generates a request to fetch a mobile phone ROM file from a local repository in a privileged location that is only accessible when the host device operates under a second user account having additional privileges not available when under the first user account; responding to the request generated by the phone maintenance tool by fetching the requested mobile phone ROM file from the first-user-account-accessible local cache; and providing, to the vendor-compliant phone maintenance tool, a handle to the fetched requested mobile phone ROM file.

In some embodiments a method of operating a multi-user-account host device coupled to a peripheral phone where a vendor-compliant phone maintenance tool specific to the coupled phone executes on the host device, the method comprising when the host device operates under a first user account, the vendor-compliant tool, executing on the host device operating under the first user account so as to generate a request to access mobile phone ROM file(s) from a first local cache, responding to the request of step by blocking the request of step so that the vendor-compliant maintenance tool does not access the first local cache fetching the mobile phone ROM file(s) requested by the maintenance tool in step from a user-account-independent local cache providing, to the maintenance tool, a handle to the mobile phone ROM file fetched in response to the request of step from the user-account-independent local cache; and when the host device operates under second user account and the vendor-compliant tool, executing on the host device operating under the second user account so as to generate a request to access mobile phone ROM file(s) from a second local cache, responding to the request of step by blocking the request of step so that the vendor-compliant maintenance tool does not access the second local cache; fetching the mobile phone ROM file(s) requested by the maintenance tool in step from the user-account-independent local cache providing, to the maintenance tool, a handle to the mobile phone ROM file fetched in response to the request of step from the user-account-independent local cache.

In some embodiments a method of operating a host device coupled to a peripheral phone where a vendor-compliant phone maintenance tool specific to the coupled phone executes on the host device, the method comprising receiving a tool-phone-state-incompatible user tool-command at the host device to modify the peripheral phone, the tool-phone-state-incompatible tool command being incompatible with the combination of the coupled phone in its current state and the vendor-compliant phone maintenance tool executing on the host device in response to an attempted mode interrogation by the vendor-compliant phone maintenance tool executing on the host device of the peripheral phone, sending a falsified description of the peripheral phone state (e.g. indicating that the phone is in normal mode when, in fact, it is in emergency mode) to the executing vendor-compliant phone maintenance tool so that the user command is tool-phone-state compatible relative to the falsified description.

In some embodiments wherein the falsified description includes a falsified description of a normal mode/emergency mode state.

In some embodiments wherein the falsified description includes a falsified description of the phone OS version.

In some embodiments a method of operating a multi-user-account host device coupled to a peripheral phone where a vendor-compliant phone maintenance tool specific to the coupled phone executes on the host device, the method comprising executing code of the vendor-compliant phone maintenance tool so that the tool respectively generates, for each of first and second privilege-limited user accounts, first and second host-local ROM repositories, each host-local ROM repository being only accessible when the host device operates under its corresponding user account; maintaining on or local to the host device, an additional ROM repository that is host user-account independent; when the host device is operating under the first privilege-limited user account, intercepting, on the host, an attempted access operation, by the vendor-compliant phone maintenance tool, of a requested phone firmware object from a host-local ROM repository specific to the first user account; in response to the intercepting, fetching the phone firmware object requested by the vendor-compliant phone maintenance tool from the user-account-independent additional ROM repository; and forwarding, to the vendor-compliant phone maintenance tool, a handle to the fetched phone firmware object.

In some embodiments a method of operating a host device coupled to a plurality of peripheral phones and where the host device simultaneously executes multiple phone maintenance tool instances such that each tool instance is compatible with all of the peripheral phones of the plurality the method comprising a. maintaining in host device memory, a tool instance-phone instance map between each phone maintenance tool instance and its matching peripheral phone; and b. whenever a given one of the phone maintenance tool instances attempts to access a candidate peripheral phone that is tool-compatible and map-incompatible, blocking the attempted access and providing a handle to a different peripheral phone other than the candidate phone that is selected from the plurality of coupled peripheral phones to match the given phone maintenance tool instance according to the tool instance-phone instance map.

In some embodiments a method of extending capabilities of a singleton-limited host-side phone maintenance software (SW) tool executing on a host device coupled to a plurality of peripheral phones by providing a semi-virtual host-side software environment to multiple instances of the singleton-limited host-side phone maintenance SW tool to route communication between each phone maintenance SW tool instance and its matching coupled peripheral phone, wherein the communication routing includes, when a given SW tool instance attempts to send phone commands to a non-matching peripheral phone, intercepting the phone commands and forwarding them to a matching peripheral phone instead; and the semi-virtual host-side software environment hides the existence of non-matching peripheral phones from each instance of the singleton-limited host-side phone maintenance software tool.

In some embodiments a method of operating a multi-account host device coupled to a peripheral phone where a vendor-compliant phone maintenance tool specific to the coupled phone executes on the host device, each account being associated with a different respective privilege level the method comprising:

when the user is logged in under an account lacking administrator privileges so that the host device is operating under a privilege-limited user account, executing, in the background, a surrogate process having administrator privileges; intercepting, from the vendor-compliant phone maintenance tool specific, a privilege-incompatible host-device OS request to modify the phone; and routing at least a portion of the vendor-compliant phone maintenance tool generated request to modify the phone via the surrogate process so that host-side restricted resources required to complete the phone-modification request are provided by the surrogate process.

In some embodiments a method of operating a host device coupled to a peripheral phone where a phone maintenance tool executes on the host device, the method comprising detecting and blocking a request by the host-executing phone maintenance tool to locally backup user data from the phone onto the host device in an unencrypted form; retrieving the user data from the phone, encrypting the user data on the host device, and storing the user data on the host device or remotely away from the host device; sending a message to the host-executing phone maintenance tool that the user data has been backed up on the host device in an unencrypted form; and at a later time, responding to a request, issued by the host-executing phone maintenance tool, to read the user data locally and in an unencrypted form by retrieving and decrypting the remotely stored encrypted user data, and providing the decrypted user data to the host-executing phone maintenance tool, wherein the method is carried out so that the user data is never backed up, in an unencrypted form, on the host device.

In some embodiments wherein user data is only stored remotely away from the host device and no encrypted or unencrypted user data is stored on the host device.

BRIEF DESCRIPTION OF THE DRAWINGS

FIGS. 4-7, and 9-11 are flow charts of methods according to some embodiments.

DETAILED DESCRIPTION OF EMBODIMENTS

The invention is herein described, by way of example only, with reference to the accompanying drawings. With specific reference now to the drawings in detail, it is stressed that the particulars shown are by way of example and for purposes of illustrative discussion of the preferred embodiments of the exemplary system only and are presented in the cause of providing what is believed to be a useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how several forms of the invention may be embodied in practice and how to make and use the embodiments.

For brevity, some explicit combinations of various features are not explicitly illustrated in the figures and/or described. It is now disclosed that any combination of the method or device features disclosed herein can be combined in any manner—including any combination of features— any combination of features can be included in any embodiment and/or omitted from any embodiments. For example, in some embodiments, a plurality of presently-disclosed techniques may be performed—e.g. any combination of presently-disclosed techniques is within the scope of the present invention. The techniques are presented separately not because they are mutually exclusive, but rather for the sake of clarity.

FIGS. 2 and 3A-3C are block diagrams of a system wherein presently-disclosed surrogate tool 170 executed according to some embodiments.

Figure 1:
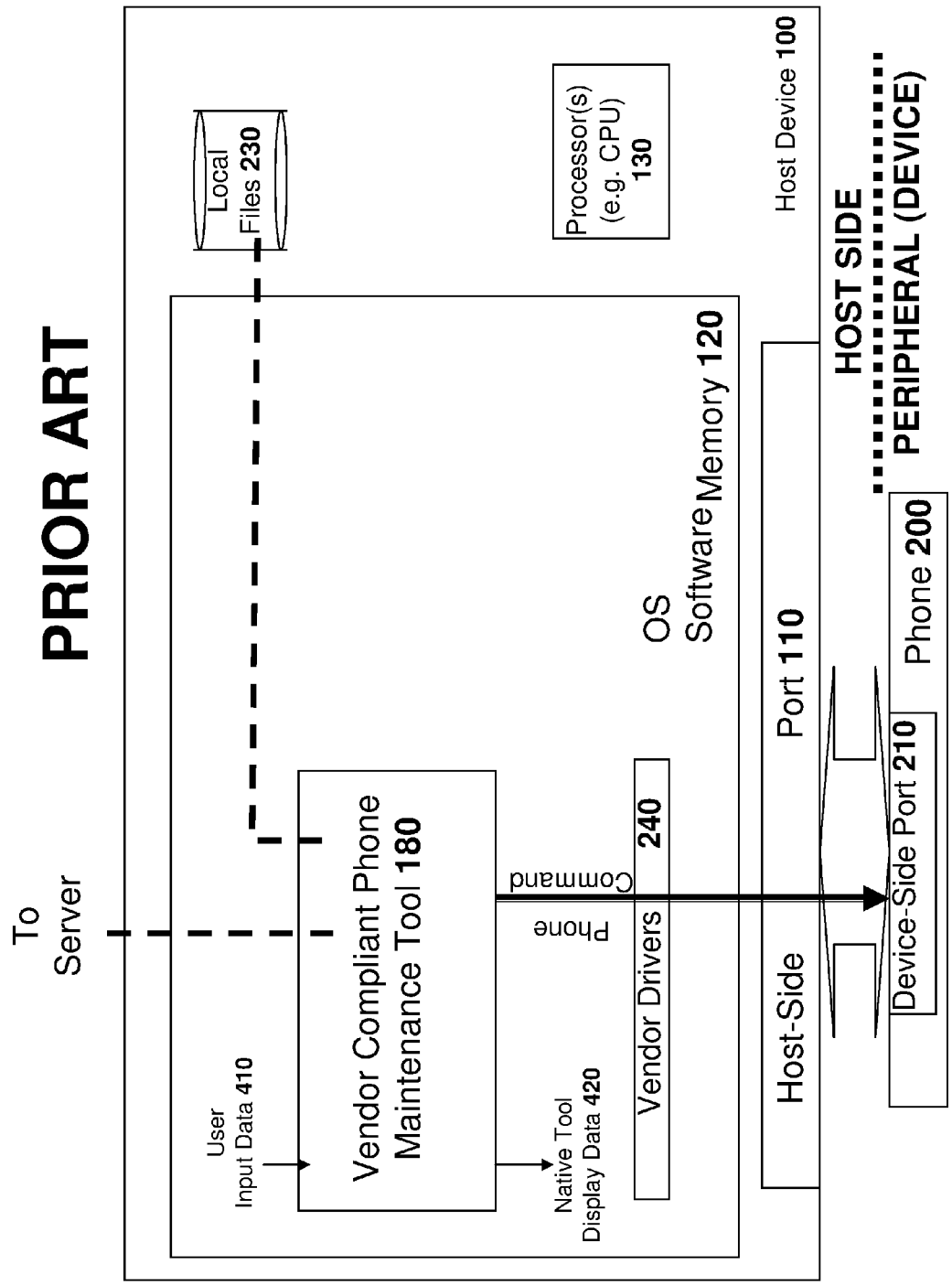
FIG. 1 is a block diagram of a prior art system.
Figure 2:
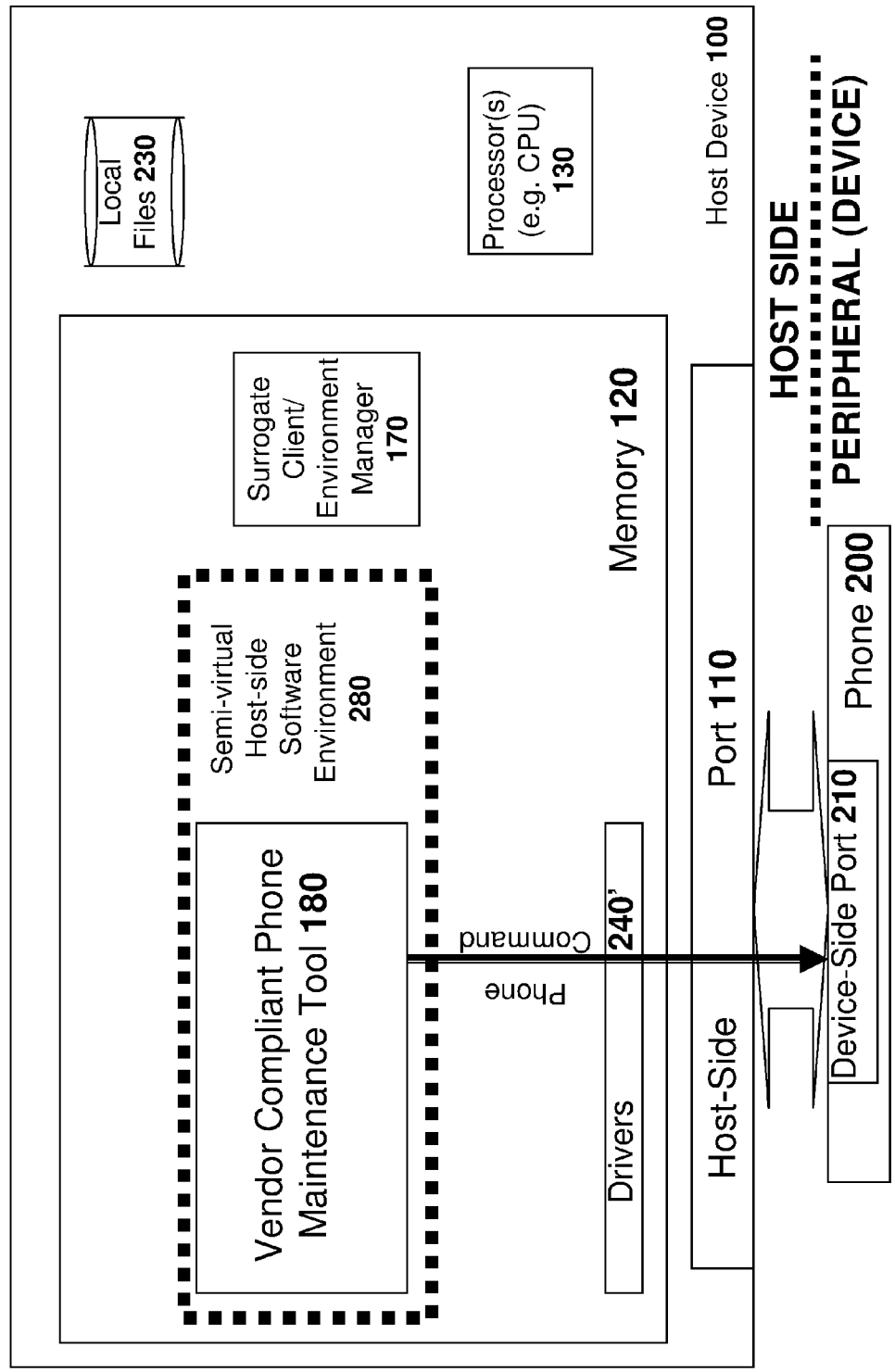
FIGS. 2 and 3A-3C are block diagram of systems according to some embodiments.

As illustrated in FIGS. 2-3 host-side surrogate tool 170 may execute on host device 100 concurrently with phone maintenance tool 180 to maintain a semi-virtual host-side software environment 280 for vendor-compliant phone maintenance tool 180.

DEFINITIONS

For convenience, in the context of the description herein, various terms are presented here. To the extent that definitions are provided, explicitly or implicitly, here or elsewhere in this application, such definitions are understood to be consistent with the usage of the defined terms by those of skill in the pertinent art(s). Furthermore, such definitions are to be construed in the broadest possible sense consistent with such usage.

A "virtual software environment" is provided by a virtual machine such that software executes within the virtual machine. For a software (SW) application or SW component executing within a virtual environment, the software application or component is completely isolated from the host operating system and typically can only access OS services via the virtual machine—i.e. direct access is not permitted.

A "semi-virtual" software environment means that environment manager SW components execute on the host device together with the target component or application. In this case, the environment manager can dynamically in real-time disassociate actual resources from virtual resources where the target component has hybrid access to both for very specific reasons—e.g. to present falsified phone state, access resources only available to administrator privileges, re-direct file repositories.

A "user command" is a command specified by a user—for example, in user input data 410.

A "tool-command" is a command for host-side execution by phone maintenance tool 180 rather than a command for execution by peripheral phone 200. At a minimum, a 'tool-command' requires host-side execution a command by the tool. However, in reference to the term 'tool-command,' there is no requirement for the phone maintenance tool 180 to be previously executing. In one scenario, execution of a 'tool command' may include both (i) launching, on the host, of the phone maintenance tool 180 combined with subsequent execution of the 'tool-command' by the launched host-side phone maintenance tool 180.

A "phone command" is a command for execution by peripheral phone 200. For example, "phone commands" may be generated by phone maintenance tool 180 or by surrogate tool 170.

Figure 3A:
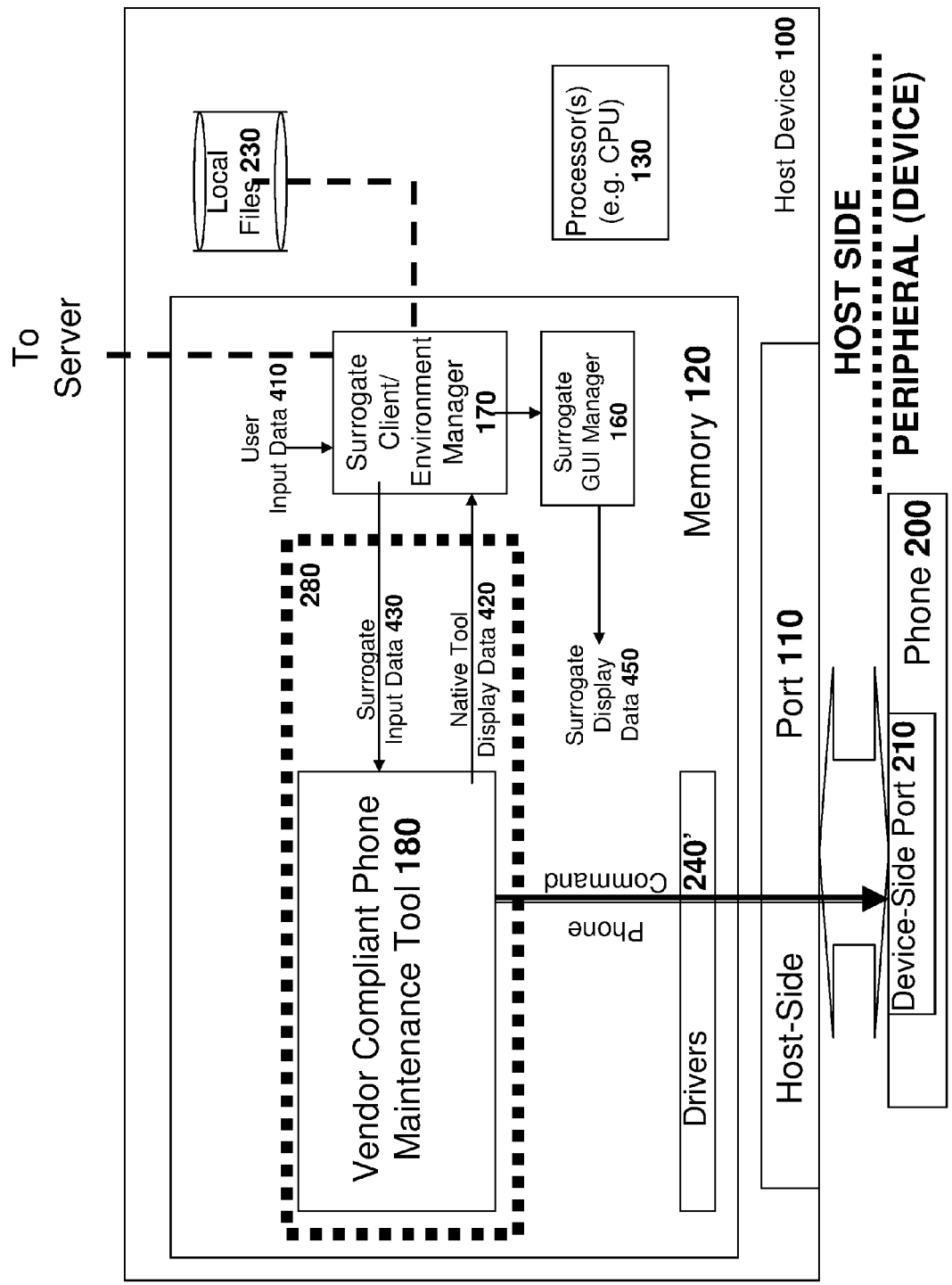
Figure 3B:
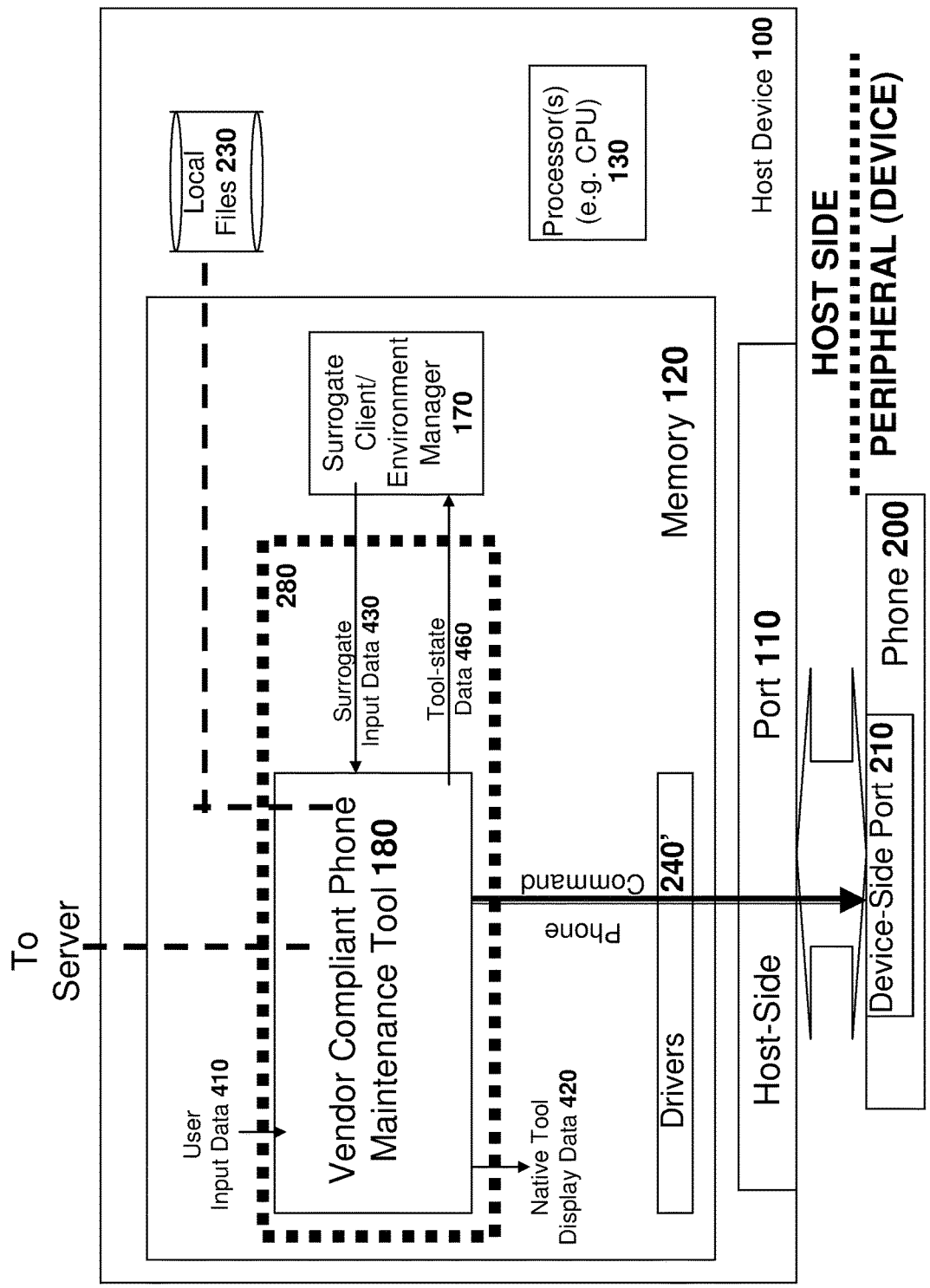
Figure 3C:
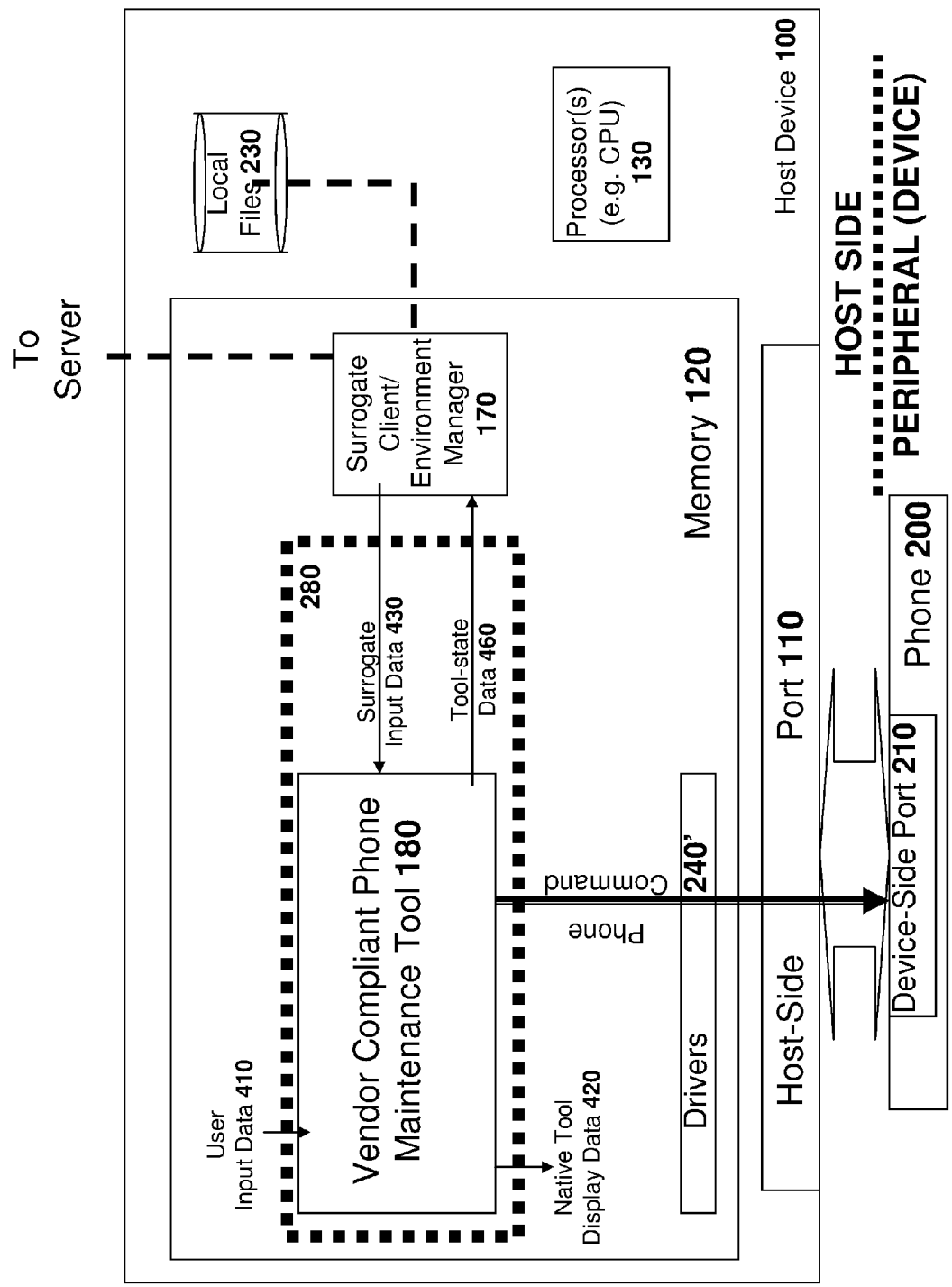

FIGS. 3A-3C illustrate various non-limiting exemplary architectures for how surrogate tool 170 may interact with phone maintenance tool 180. In the example of FIG. 3A, surrogate tool 170 may include GUI components. For example, surrogate tool 170 may 'over-ride' GUI input functionality of phone maintenance tool 180 configure so that user input data 410 supplied to surrogate tool 170, rather than directly to phone maintenance tool 180. In response to receiving the user-supplied input-data, surrogate tool 170 may send 'surrogate input data 430' to phone maintenance tool 180, rather than the actual user-supplied input-data. One example of 'surrogate input data 430' that may be send from surrogate tool 170 to vendor-compliant phone maintenance tool 180 is tool-command(s) to be executed on the host side by phone maintenance tool 180. In this example, the tool command(s) may be generated by surrogate tool 170 rather than directly derived from user inputs.

In FIG. 3A, surrogate tool 170 receives information about phone maintenance tool 180 (for example, information indicative of a state of phone maintenance tool 180) by receiving the native tool display data 420 that would ordinarily be used to display information to the user. Surrogate tool 170 may then analyze the native tool display data 420—e.g. subject this data 420 to optical character recognition (OCR) algorithms or in any other manner.

Another example of receipt, by surrogate tool 170, of tool-state data 460 descriptive of a state of phone maintenance tool 180 is presented in FIG. 3B. According to this example, data 460 other than display data is received by surrogate tool 170.

FIG. 3C illustrates yet another architecture for interaction between surrogate tool 170 and phone maintenance tool 180. The configurations illustrated are not intended as limiting and no attempt has been made to exhaustively describe all possible configurations.

Figure 4:
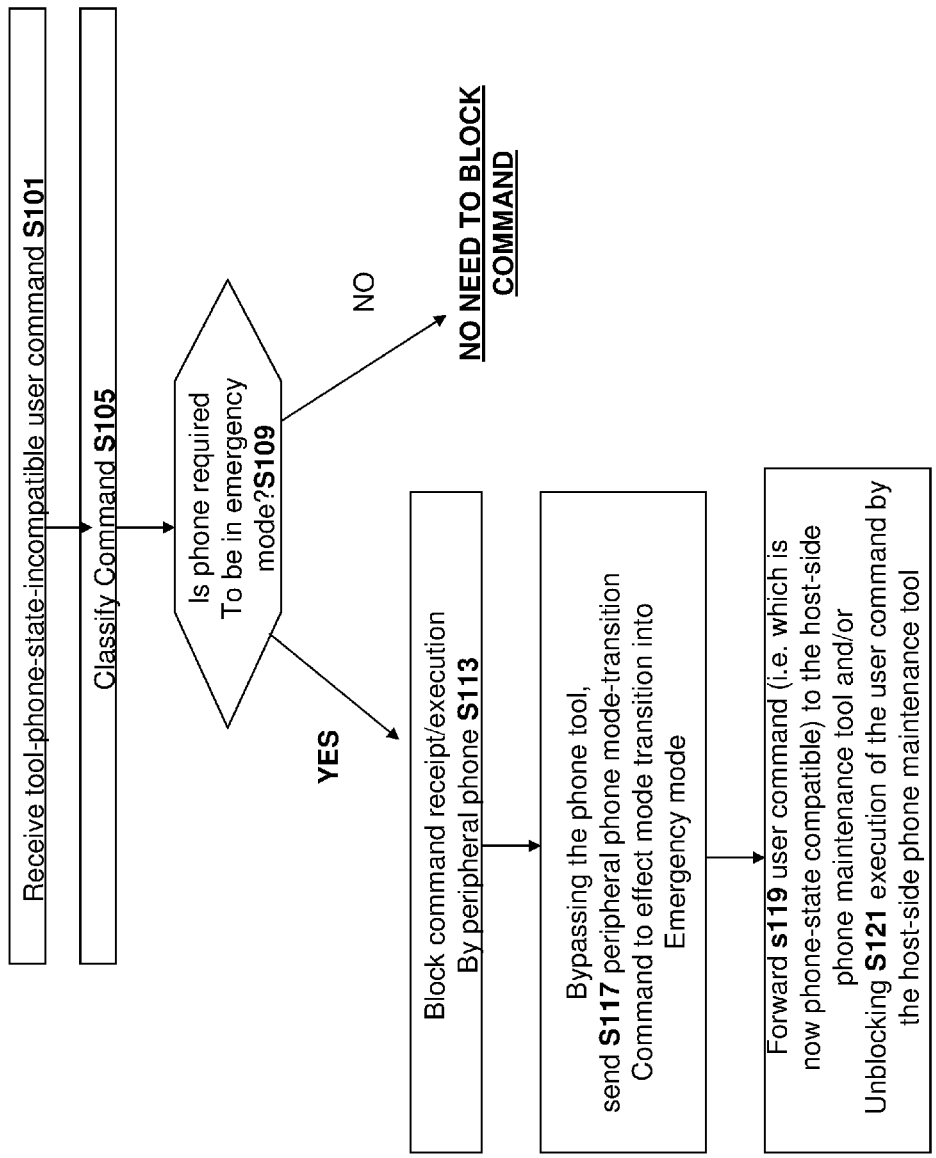

Discussion of FIG. 4—A First Method of Operating a Host Device

FIG. 4 relates to causing vendor-compliant phone maintenance tool 180 to execute tool-phone-state-incompatible commands.

FIG. 4 is a flow chart of a first method of operating a host device 100 coupled to a peripheral phone 200 where a vendor-compliant phone maintenance tool 180 (or component thereof) specific to the coupled phone 200 executes (e.g. by processor(s) 130) on the host device 100.

The method of FIG. 4 comprises: (i) at a time when the multi-mode peripheral mode is in a first of the operating modes, receiving S101 (e.g. in the context of 410 or 460) a tool-phone-state-incompatible user tool command at the host device to modify e.g. to install firmware, upgrade, downgrade, install firmware) the peripheral phone 200, the tool-phone-state-incompatible tool command being incompatible with the combination of the coupled phone 200 in the first operating mode and the vendor-compliant phone maintenance tool 180 executing on the host device; (ii) in response to the receiving of the user command at the host device: i. classifying S105 the received user command to determine if the phone is required to be in the first operating mode in order to execute the user command; and ii. contingent upon a positive classifying, blocking S113 receipt or execution of the command by the vendor-compliant phone maintenance tool and sending S117 the peripheral phone a mode-transition command not via the vendor-compliant phone maintenance tool to effect a mode transition from the first to the second operating mode so as to render the user command tool-phone-state-compatible. In some embodiments, after the sending of the mode-transition command, forwarding S119 the user command to the vendor-compliant phone maintenance tool or unblocking execution of the user command by the vendor-compliant phone maintenance tool.

Figure 5:
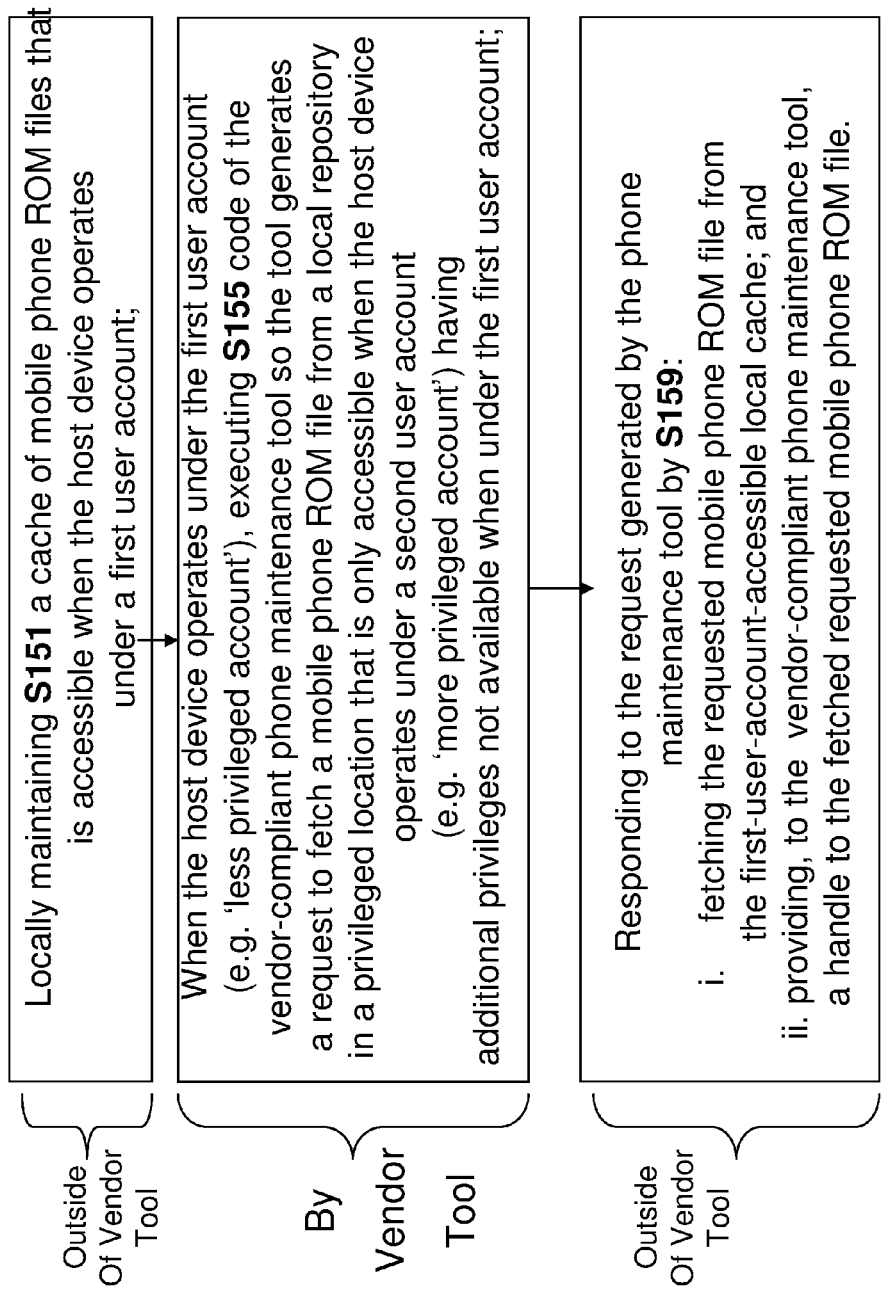

Discussion of FIG. 5—A Second Example of Operating a Host Device

FIG. 5 relates to over-riding behavior of host-side vendor-compliant phone maintenance tool 180 with respect to account privileges.

FIG. 5 is a flow chart of a second method of operating a host device 100 coupled to a peripheral phone 200 where a vendor-compliant phone maintenance tool 180 (or component thereof) specific to the coupled phone 200 executes (e.g. by processor(s) 130) on the host device 100.

The method of FIG. 5 comprises: a. locally maintaining s151 (i.e. local and on the host side) a cache of mobile phone ROM files (i.e. firmware for mobile phone—e.g. in 230) that is accessible when the host device operates under a first user account (e.g. an 'ordinary user account' lacking administrator privileges); b. when S155 the host device operates under the first user account (e.g the ordinary user account), executing code of the vendor-compliant phone maintenance tool so the tool generates a request to fetch a mobile phone ROM file from a local repository in a privileged location (e.g. 'a special directory' only accessible to administrators) that is only accessible when the host device operates under a second user account (e.g. an 'administrator account') having additional privileges not available when under the first user account; c. responding to the request generated by the phone maintenance tool by: i. fetching S159A the requested mobile phone ROM file from the first-user-account-accessible local cache; and ii. providing S159B, to the vendor-compliant phone maintenance tool, a handle to the fetched requested mobile phone ROM file.

The routine of FIG. 5 may be useful when vendor tool 180 is hardcoded to only access files from a cache accessible only under privileged mode. Thus, it is possible to pre-cache the ROM files in a different location.

A related routine is as follows: a. when the host device operates under a first user account, the vendor-compliant tool, executing on the host device operating under the first user account so as to generate a request to access mobile phone ROM file(s) from a first local cache, responding to the request of step (a) by:
  i. blocking the request of step (a) so that the vendor-compliant maintenance tool 180 does not access the first local cache;
  ii. fetching the mobile phone ROM file(s) requested by the maintenance tool in step (a) from a user-account-independent local cache;
  iii. providing, to the maintenance tool, a handle to the mobile phone ROM file fetched in response to the request of step (a) from the user-account-independent local cache; and
b. when the host device operates under second user account (i.e. different from the first user account) and the vendor-compliant tool 180, executing on the host device 100 operating under the second user account so as to generate a request to access mobile phone ROM file(s) from a second local cache, responding to the request of step (b) by:
  i. blocking the request of step (b) so that the vendor-compliant maintenance tool does not access the second local cache;
  ii. fetching the mobile phone ROM file(s) requested by the maintenance tool in step (b) from the user-account-independent local cache;
  iii. providing, to the maintenance tool, a handle to the mobile phone ROM file fetched in response to the request of step (b) from the user-account-independent local cache.

Figure 6:
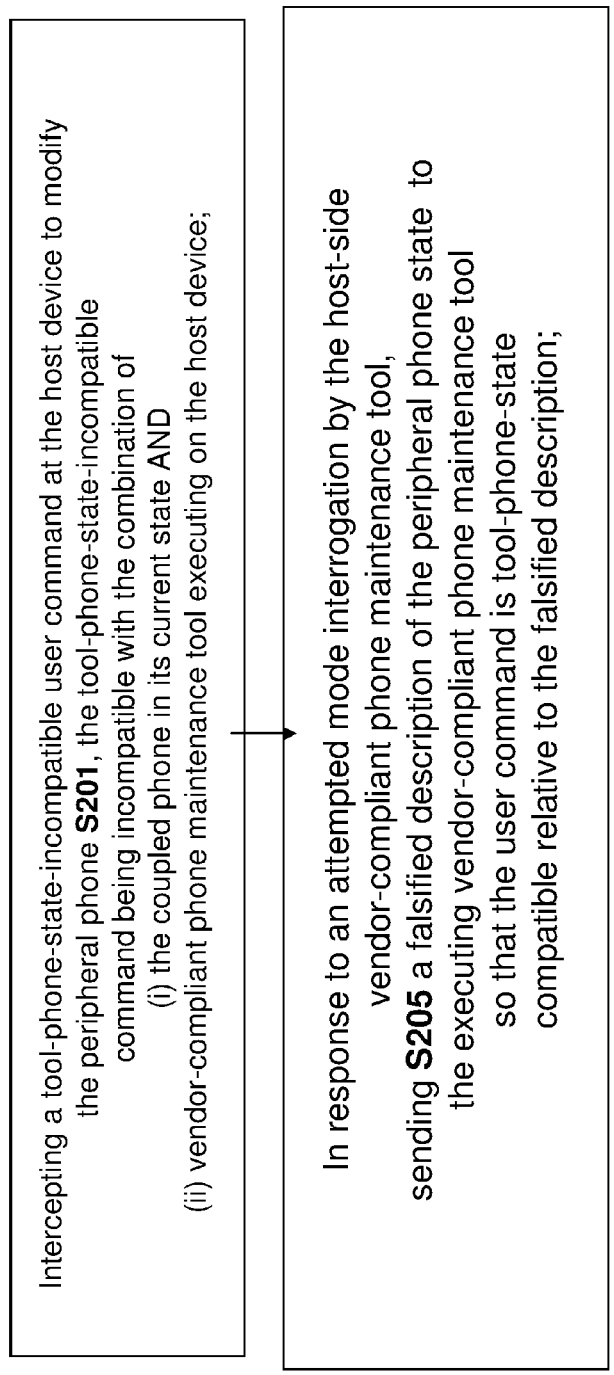

Discussion of FIG. 6—A Third Example of Operating a Host Device

FIG. 6 relates to 'spoofing' of vendor tool 180 by surrogate tool 170 to cause vendor tool 180 to execute a command that it would not otherwise execute.

FIG. 6 illustrates a method of operating a host device 100 coupled to a peripheral phone 200 where a vendor-compliant phone maintenance tool 180 specific to the coupled phone executes on the host device, the method comprising:
  a. receiving or intercepting S201 a tool-phone-state-incompatible user tool-command (i.e. a user command to vendor tool 180—e.g. provided as part of 410) at the host device (e.g. by surrogate tool 170) to modify the peripheral phone 200, the tool-phone-state-incompatible tool command being incompatible with the combination of the coupled phone in its current state and the vendor-compliant phone maintenance tool executing on the host device (e.g. vendor tool 180 may be hardcoded not to execute this command if the phone is in the 'wrong' mode or has the 'wrong' OS—toward this end, vendor tool 180 may attempt to interrogate phone 200 to ascertain its mode); b. in response to an attempted mode interrogation by the vendor-compliant phone maintenance tool 180 executing on the host device 200 of the peripheral phone, sending S205 a falsified description of the peripheral phone state (e.g. indicating that the phone is in normal mode when, in fact, it is in emergency mode) to the executing vendor-compliant phone maintenance tool so that the user command is tool-phone-state compatible relative to the falsified description.

In some embodiments, the falsified description includes a falsified description of a normal mode/emergency mode state.

In some embodiments, the falsified description includes a falsified description of the phone OS version (e.g. tool 180 may be hardcoded not to re-flash to downgrade).

Spoofing Scenario 'A'—
in one example, we let the user-command partly execute and falsify initial information—for example, the tool-command may be 'install firmware version 6.0 on the phone'—the tool has a policy to never downgrade and this policy cannot be broken—in order to 'install V 6.0' the tool breaks this up into 2 steps—in step 1, the tool asks the phone 'what is your version' (i.e. the tool sends a 'phone-command' to the phone where the 'phone-command' is 'describe your version'; and in step 2, after receiving the response from the phone that has executed the phone-command, we verify that the version is less than 6.0.

Spoofing Scenario 'B'—
in another example, when the tool launches it automatically asks the phone its version and then stores this info on the host side in volatile or non-volatile memory—in this example, when we receive the command 'install version 6.0' we create a logical disconnect between the phone and the host to fool the host tool into re-interrogating the 'phone' but this time we intercept the re-interrogation command and give our own falsified description about the phone—>'how do we logically disconnect between the phone and the host?'—since we own the USB hub/the driver we generate within the host OS and event as if there is a simulated disconnect.

Spoofing Scenario 'C'—

Figure 7:
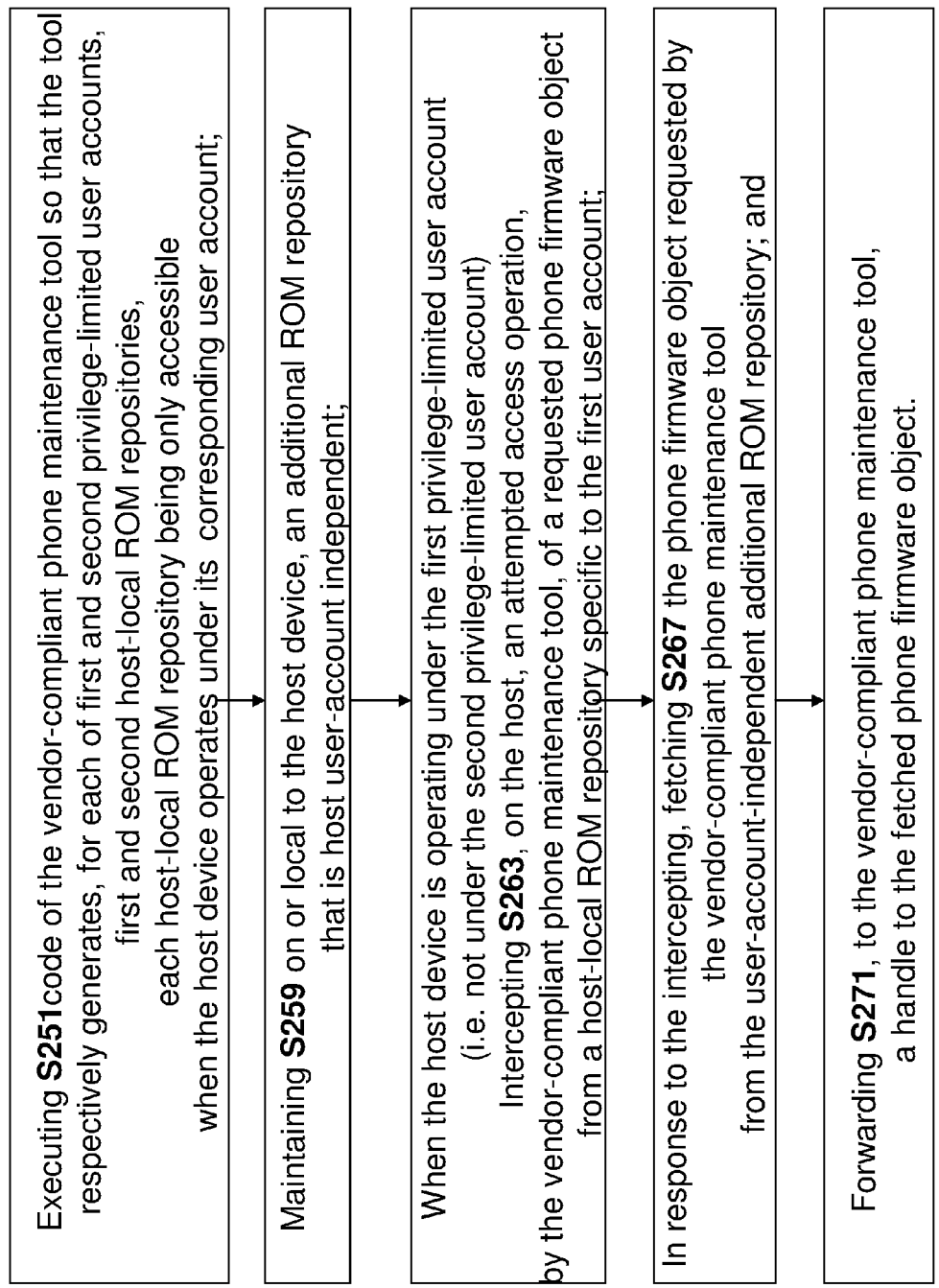

Another scenario: the tool interrogates the device upon launching. So when the user-command arrives, it might be too late. We need to:

intercept the user-command simulate a disconnect & reconnect of the device wait for interrogation, falsify the response forward the user-command to the tool Discussion of FIG. 7—A Fourth Example of Operating a Host Device FIG. 7 method of operating a multi-user-account host device coupled to a peripheral phone 200 where a vendor-compliant phone maintenance tool 180 specific to the coupled phone executes on the host device, the method comprising:

a. executing S251 code of the vendor-compliant phone maintenance tool 180 so that the tool respectively generates first and second host-local ROM repositories (e.g. each ROM repository may be in a different directory and corresponds to a different account—host-device account 'X' would correspond to directory 'X' and host-device account Y would correspond to directory 'Y' for each of first and second privilege-limited user accounts, each host-local ROM repository being only accessible when the host device operates under its corresponding user account;

b. maintaining S259 (e.g. by surrogate tool 170) on or local to the host device, an additional ROM repository S259 that is host user-account independent (e.g. accessible from any host-device account)

c. when the host device is operating under the first privilege-limited user account (i.e. and not under the second privilege-limited user account), intercepting S263 (e.g. by surrogate tool 170), on the host, an attempted access operation, by the vendor-compliant phone maintenance tool, of a requested phone firmware object (e.g. ROM file) from a host-local ROM repository specific to the first user account;

d. in response to the intercepting, fetching S267 (e.g. by surrogate tool 170), the phone firmware object requested by the vendor-compliant phone maintenance tool from the user-account-independent additional ROM repository; and e. forwarding S271 (e.g. by surrogate tool 170), to the vendor-compliant phone maintenance tool, a handle to the fetched phone firmware object.

Figure 8A:
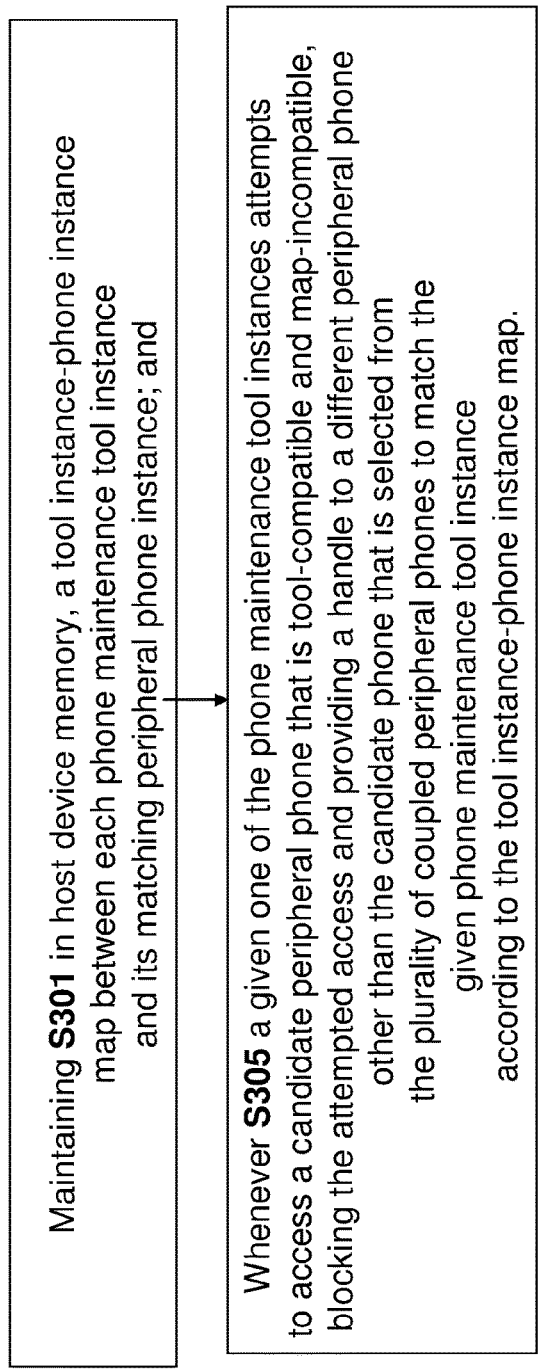
FIGS. 8A-8B illustrate a method of operating a host device coupled to a plurality of peripheral phones
Figure 8B:
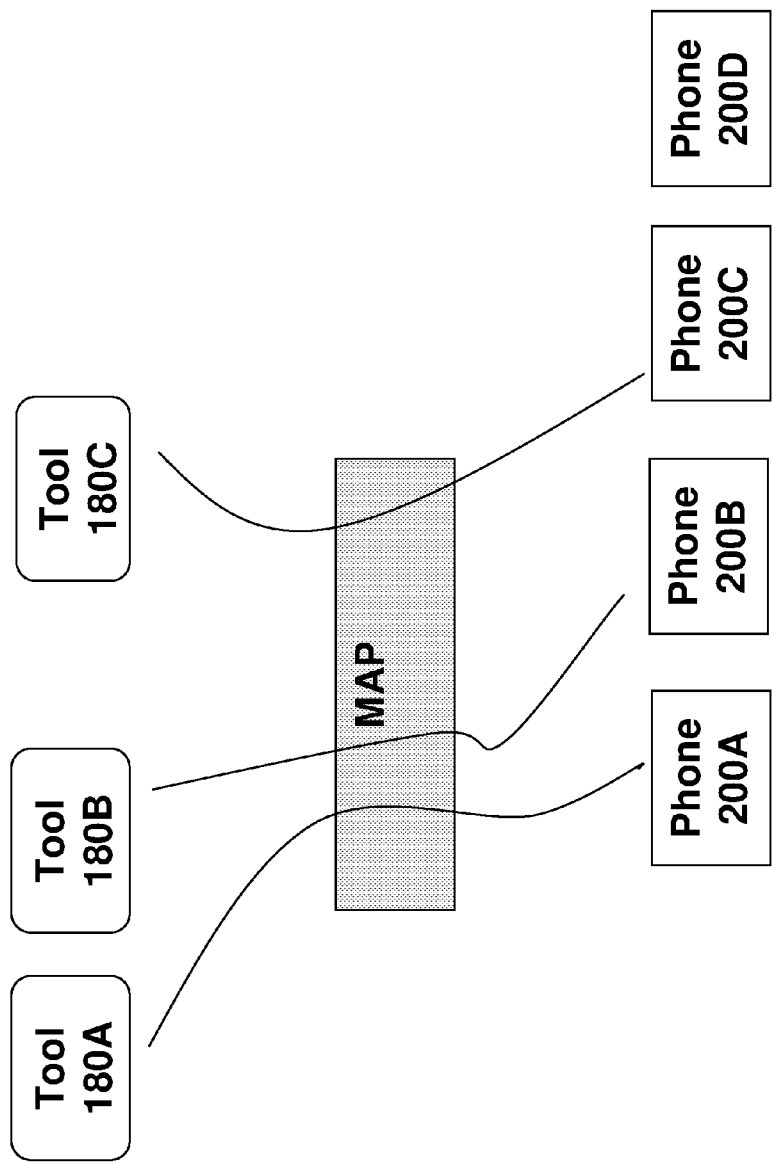

Discussion of FIGS. 8A-8B—A Fifth Example of Operating a Host Device

FIGS. 8A-8B relate to a situation where multiple peripheral phones are simultaneously coupled to, and in communication with, the host device.

Some vendor tools 180 may be hard-coded to only support operation with a single coupled peripheral phone 120 and/or hard-coded so that only a single instance of vendor tool 180 executes at once on host device. Embodiments of the present invention relates to vendor-compliant phone maintenance tools 180 that, during normal operation thereof, are hard-coded to operate only with at most N coupled peripheral phone devices (N is a positive integer). In some embodiments, the surrogate tool 170 may extend the functionality of the vendor-compliant phone maintenance tool 180 to operate with M coupled peripheral device wherein M is a positive integer exceeding N. Towards this end, once again false information may be supplied, by the surrogate tool, to the vendor-compliant phone maintenance tool. In particular, it is possible to provide false information to tool 180 about the number of peripheral phones 120 coupled to the host device.

Thus, it is possible to simultaneously execute multiple instances of tool 180. To avoid conflicts (i.e. between coupled phones and instances of tool 180) and to insure that each tool instance 180 communicates with the 'matching' peripheral phone 200, the surrogate tool may emulate a device connectivity environment, and map instances of the vendor-compliant phone maintenance tools to matching peripheral phones.

Thus, if instances A, B and C of tool 180 execute and phones X, Y and C are coupled to host 100 via different report, it may be possible to map tool A to phone X, t to map tool B to phone Y and to map tool C to phone Z.

FIG. 8A and FIG. 8B illustrate a method of operating a host device coupled to a plurality of peripheral phones and where the host device simultaneously executes multiple phone maintenance tool instances such that each tool instance is compatible with all of the peripheral phones of the plurality the method comprising: a. maintaining S301 in host device memory, a tool instance-phone instance map (i.e. a data structure maintained on the host side—e.g. in memory 120) between each phone maintenance tool instance 180A, 180B . . . and its matching peripheral phone 200A, 200B , , , ; and b. whenever S305 a given one of the phone maintenance tool instances 180 attempts to access a candidate peripheral phone that is tool-compatible and map-incompatible (e.g. tool instance 180A which matches phone 200A but attempts to access the 'wrong' phone 200B—e.g. by enumerating over device ports), blocking S305 the attempted access and providing a handle to a different peripheral phone other than the candidate phone that is selected from the plurality of coupled peripheral phones to match the given phone maintenance tool instance.

In one example related to step S305, when instance 180 attempts to access phone 200B this is blocked and a handle to phone 200A provided instead. The determination of which phone with a given tool instance is carried out according to the tool instance-phone instance map (e.g. a 'matching' phone which matches the tool-instance).

With reference to step S305, it is noted that when more than one peripheral phone 200 is coupled to host 100, tool 180 may attempt to access (e.g. to send data or a command thereto or to obtain a handle thereof) a 'candidate phone'— that is the phone for which an access operation by tool 180 is initially attempted. For example, tool 180 may be hard-coded to enumerate phones irrespective of the 'correct mapping' of the mapping managed by surrogate tool 170, and the first 'candidate' phone may be, for example, a phone coupled to a specific host-side port according to some port ranking. A candidate phone is 'tool compatible' if is a model compatible with that handled by tool 180. It is 'map incompatible' if the phone identity relative to the tool instance identity contradicts the contact of the "vendor tool 180 instance-phone instance map" maintained by surrogate tool 180.

Related Method:

A related method is as follows. A method of extending capabilities of a singleton-limited host-side phone maintenance software (SW) tool 180 (e.g. hardcoded only to operate with a single coupled phone 200) executing on a host 100 device coupled to a plurality of peripheral phones 200A, 200B, by providing a semi-virtual host-side software environment 280 to multiple instances (200A, 200B, . . . ) of the singleton-limited host-side phone maintenance SW tool to route communication between each phone maintenance SW tool instance and its matching coupled peripheral phone. The method is carried out so that i. the communication routing includes, when a given SW tool instance attempts to send phone commands to a non-matching peripheral phone, intercepting the phone commands and forwarding them to a matching peripheral phone instead; and ii. the semi-virtual host-side software environment 280 hides the existence of non-matching peripheral phones from each instance of the singleton-limited host-side phone maintenance software tool.

Discussion of FIG. 9—A Sixth Example of Operating a Host Device

As noted above, FIGS. 8A-8B relate to a situation where multiple peripheral phones are simultaneously coupled to, and in communication with, the host device. This is also true about the example of FIG. 9.

FIG. 9 describes a method of extending capabilities of a singleton-limited host-side phone maintenance software (SW) tool executing on a host device coupled to a plurality of peripheral phones by providing a semi-virtual host-side software environment to multiple instances of the singleton-limited host-side phone maintenance SW tool to route communication between each phone maintenance SW tool instance and its matching coupled peripheral phone, wherein: i. the communication routing includes, when a given SW tool instance attempts to send phone commands to a non-matching peripheral phone, intercepting the phone commands and forwarding them to a matching peripheral phone instead; and ii. the semi-virtual host-side software environment hides the existence of non-matching peripheral phones from each instance of the singleton-limited host-side phone maintenance software tool.

Figure 10:
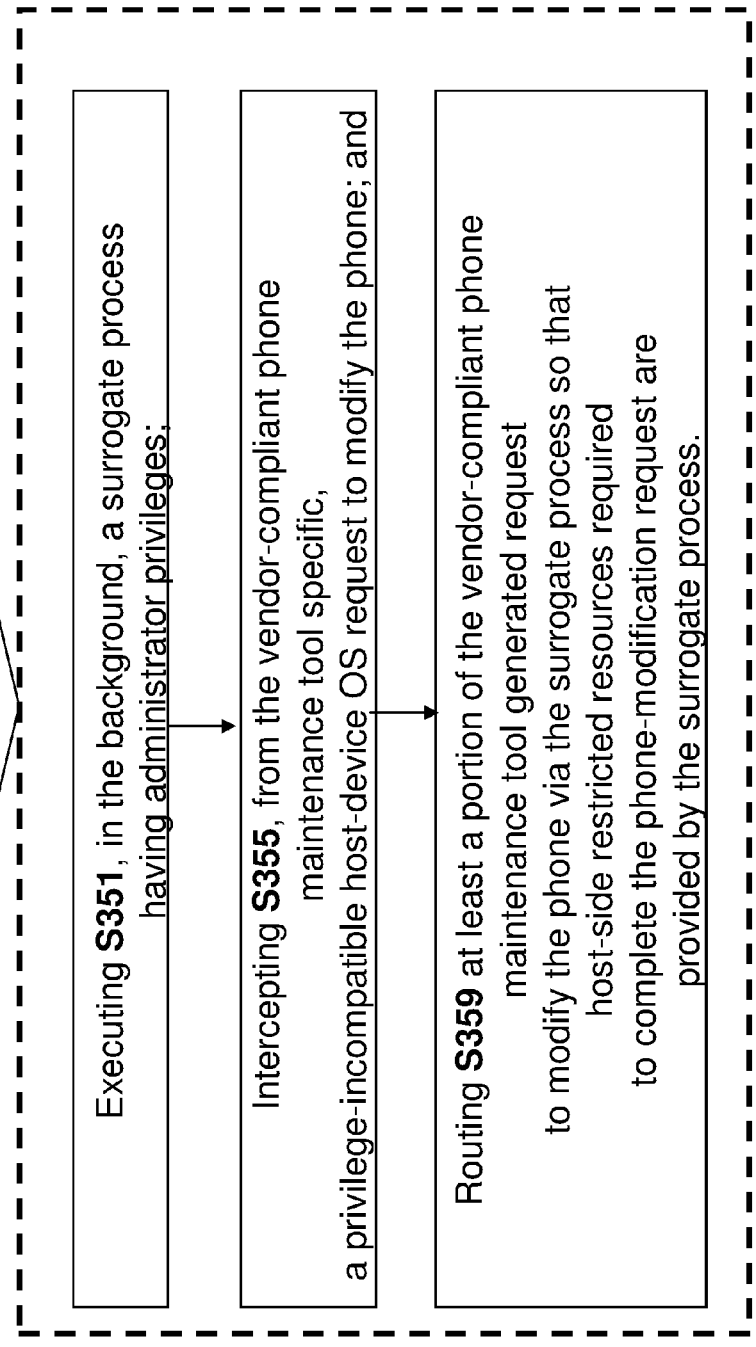

The skilled artisan will recognize, after reading the present disclosure, that this may be generalized to a method extending capabilities of a N-limited host-side phone maintenance software (SW) tool executing on a host device coupled to a M (N and M are both positive integers, N>M) of peripheral phones by providing a semi-virtual host-side software environment to multiple instances of the N phone-limited host-side phone maintenance SW tool to route communication between each phone maintenance SW tool instance and its matching coupled peripheral phone, Discussion of FIG. 10

FIG. 10 relates, once again, to host devices 100 having multiple accounts—e.g. 'user1 account,' 'user2 account,' etc. FIG. 10 relates to a method of operating a multi-account host device 100 coupled to a peripheral phone 200 where a vendor-compliant phone maintenance tool 180 specific to the coupled phone executes on the host device, each account being associated with a different respective privilege level (e.g. for example, 'user1' account may have privileges denied to 'user2' account—e.g. access to certain system resources, etc) the method comprising: when the user is logged in (i.e. on host device 100 under an account lacking administrator privileges so that the host device 100 is operating under a privilege-limited user account: a. executing s351, in the background, a surrogate process (NOT SHOWN—this surrogate process may reside in memory 120 as a component of surrogate tool 170 or controlled by surrogate tool 170) having administrator privileges; b. intercepting S355 (e.g. by surrogate tool 170), from the vendor-compliant phone maintenance tool specific, a privilege-incompatible host-device OS request to modify the phone; and c. routing S359 at least a portion of the vendor-compliant phone maintenance tool generated request to modify the phone via the surrogate process so that host-side restricted resources required to complete the phone-modification request are provided by the surrogate process.

The term privilege-incompatible host-device OS request is a request which the vendor tool 180 is unable to/refuses to carry out based upon a current state of the host operating system (OS).

Figure 11:
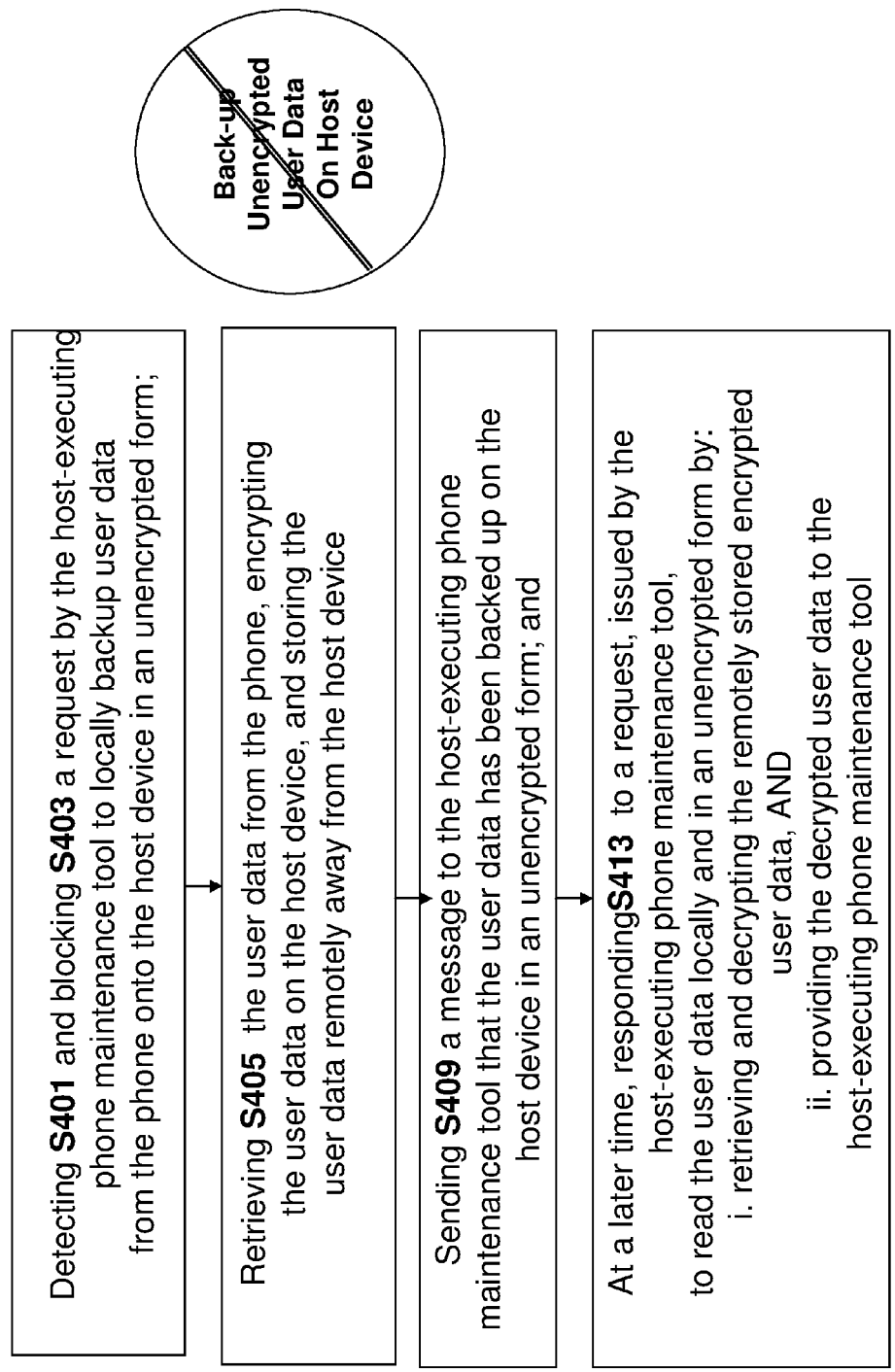

Discussion of FIG. 11

In some embodiments, vendor tool 180 may violate privacy or security policies.

FIG. 11 relates to a method of operating a host device 100 coupled to a peripheral phone 200 where a phone maintenance tool executes 180 on the host device, the method comprising: a. detecting S401 and blocking S403 (e.g. by surrogate tool 170) a request by the host-executing phone maintenance tool to locally backup user data from the phone onto the host device in an unencrypted form; b. retrieving S405 the user data from the phone (or obtaining the user data in any other manner), encrypting the user data on the host device, and storing the user data on the host device or remotely away from the host device (this may be carried out in any manner, for example, by surrogate tool 170); c. sending S409 (e.g. by surrogate tool 170) a message to the host-executing phone maintenance tool 180 that the user data has been backed up on the host device in an unencrypted form; and d. at a later time, responding S413 to a request, issued by the host-executing phone maintenance tool 180, to read the user data locally and in an unencrypted form by: i. retrieving and decrypting the remotely stored encrypted user data, and ii. providing the decrypted user data to the host-executing phone maintenance tool, wherein the method is carried out so that the user data is never backed up, in an unencrypted form, on the host device.

The 'backing up' of data is defined as storing to non-volatile memory of the host device or on the host side.

In some embodiments, user data is only stored remotely away from the host device and no encrypted or unencrypted user data is stored on the host device.

Preventing a Vendor Tool 180 from Upgrading Itself or from Upgrading the Phone (Method I)

In some embodiments, vendor tool 180 may attempt to upgrade itself or the phone or upgrading a host-side local ROM repository by downloading (and storing on the host-side) newer ROM files for phone 200—e.g. to download a new version thereof from the server. It is possible for surrogate tool 170 to prevent this from happening in any one or more of a number of ways.

Block the Call (e.g. by Surrogate Tool 170):

For example, it may be possible to block remote access of data from vendor tool. Some tools (e.g. WebSL) check first online, then locally—blocking the Online will cause them to work only with the local repository.

Modify/Falsify Request (e.g. by Surrogate Tool 170) from Vendor Tool 180 after it is Generated When we cannot block the call for some reason. Could prevent auto-update, especially if request includes current version. In cases when we depend on the server's logic: request includes details such as device model, current version, tool identity. We modify the parameters, for example the version to an older than actual. Thus we allow re-flashing or downgrading or re-branding when no such original support is available.

Modify/Falsify Response Received (e.g. by Surrogate Tool 170) from the Server Before it is Received by Vendor Tool 180— could prevent update, if we modify the "update available" (to "no"), "most current version" (to same as current), or sabotage/modify the download link (to a non-existing) sent back from the remote server.

Could prevent ROM retrieval if modify the version or sabotage the location.

Could direct to local location or another version (for downgrade/reflash/different operator's ROM) if modify the URI.

Could direct to local repository even if tool originally does not support it (e.g. Samsung KIES & Sony USP)

It is further noted that any of the embodiments described above may further include receiving, sending or storing instructions and/or data that implement the operations described above in conjunction with the figures upon a computer readable medium. Generally speaking, a computer readable medium may include storage media or memory media such as magnetic or flash or optical media, e.g. disk or CD-ROM, volatile or nonvolatile media such as RAM, ROM, etc. as well as transmission media or signals such as electrical, electromagnetic or digital signals conveyed via a communication medium such as network and/or wireless links.

In the description and claims of the present application, each of the verbs, "comprise" "include" and "have", and conjugates thereof, are used to indicate that the object or objects of the verb are not necessarily a complete listing of members, components, elements or parts of the subject or subjects of the verb.

All references cited herein are incorporated by reference in their entirety. Citation of a reference does not constitute an admission that the reference is prior art.

The articles "a" and "an" are used herein to refer to one or to more than one. (i.e., to at least one) of the grammatical object of the article. By way of example, "an element" means one element or more than one element.

The term "including" is used herein to mean, and is used interchangeably with, the phrase "including but not limited" to.

The term "or" is used herein to mean, and is used interchangeably with, the term "and/or," unless context clearly indicates otherwise.

The term "such as" is used herein to mean, and is used interchangeably, with the phrase "such as but not limited to".

The present invention has been described using detailed descriptions of embodiments thereof that are provided by way of example and are not intended to limit the scope of the invention. The described embodiments comprise different features, not all of which are required in all embodiments of the invention. Some embodiments of the present invention utilize only some of the features or possible combinations of the features. Variations of embodiments of the present invention that are described and embodiments of the present invention comprising different combinations of features noted in the described embodiments will occur to persons skilled in the art.

What is claimed:

1. A method of operating a host device coupled to a peripheral phone where a vendor-compliant phone maintenance tool specific to the coupled phone executes on the host device, the method comprising:
   a. receiving a tool-phone-state-incompatible user tool-command at the host device to modify the peripheral phone, the tool-phone-state-incompatible tool command being incompatible with a combination of the coupled phone in its current state and the vendor-compliant phone maintenance tool executing on the host device; and
   b. in response to an attempted mode interrogation by the vendor-compliant phone maintenance tool executing on the host device of the peripheral phone, sending a falsified description of the peripheral phone state to the executing vendor-compliant phone maintenance tool so that the received user tool-command is tool-phone-state compatible relative to the falsified description.

2. The method of claim 1 wherein the falsified description includes a falsified description of a normal mode/emergency mode state.

3. A method of operating a host device coupled to a plurality of peripheral phones and where the host device simultaneously executes multiple phone maintenance tool instances such that each tool instance is compatible with all of the peripheral phones of the plurality the method comprising a. maintaining in host device memory, a tool instance-phone instance map between each given phone maintenance tool instance and a respective matching peripheral phone that matches the given phone maintenance tool instance; and b. whenever a given one of the phone maintenance tool instances attempts to access a candidate peripheral phone that is tool-compatible and map-incompatible, blocking the attempted access and providing a handle to a different peripheral phone other than the candidate phone the different peripheral phone being selected from the plurality of coupled peripheral phones so as to match, according to the tool instance-phone instance map, the given one of the phone maintenance tool instances that attempts to access the candidate peripheral phone.

4. A method of extending capabilities of a singleton-limited host-side phone maintenance software (SW) tool executing on a host device coupled to a plurality of peripheral phones by providing a semi-virtual host-side software environment to multiple instances of the singleton-limited host-side phone maintenance SW tool to route communication between each phone maintenance SW tool instance and a respective matching coupled peripheral phone, wherein:
   i. the communication routing includes, when a given SW tool instance attempts to send phone commands to a non-matching peripheral phone, intercepting the phone commands and forwarding them to a matching peripheral phone instead; and
   ii. the semi-virtual host-side software environment hides and existence of non-matching peripheral phones from each instance of the singleton-limited host-side phone maintenance software tool.

5. The method of any of claim 1 wherein the falsified description includes a falsified description of an OS version of the peripheral phone.

6. The method of claim 1 wherein the falsified description of the peripheral phone state, that is sent to the executing vendor-compliant phone maintenance tool:
   i. is sent at a time when the peripheral phone is in emergency mode; and
   ii. indicates that the peripheral phone is in normal mode.

* * * * *